(12) United States Patent
Margulis

(10) Patent No.: US 7,667,707 B1
(45) Date of Patent: *Feb. 23, 2010

(54) COMPUTER SYSTEM FOR SUPPORTING MULTIPLE REMOTE DISPLAYS

(75) Inventor: Neal D. Margulis, Woodside, CA (US)

(73) Assignee: Digital Display Innovations, LLC, Woodside, CA (US)

( * ) Notice: Subject to any disclaimer, the term of this patent is extended or adjusted under 35 U.S.C. 154(b) by 514 days.

This patent is subject to a terminal disclaimer.

(21) Appl. No.: 11/122,457

(22) Filed: May 5, 2005

(51) Int. Cl.
G06F 15/00 (2006.01)
G06F 15/16 (2006.01)

(52) U.S. Cl. .................. 345/519; 345/1.1; 345/1.3; 345/2.1

(58) Field of Classification Search ........... 345/1.1–1.3, 345/2.1–3, 3.1–4, 204, 418, 433, 441, 519, 345/521, 537, 545, 212, 5, 6, 501–506, 520, 345/522; 364/900; 379/93.21; 709/222, 709/223, 225; 725/37, 42, 43; 714/807
See application file for complete search history.

(56) References Cited

U.S. PATENT DOCUMENTS

| | | | |
|---|---|---|---|
| 4,094,000 A * | 6/1978 | Brudevold | .................. 345/534 |
| 5,576,738 A * | 11/1996 | Anwyl et al. | ............... 345/212 |
| 5,602,589 A | 2/1997 | Vishwanath | |
| 5,708,961 A | 1/1998 | Hylton | |
| 5,850,482 A | 12/1998 | Meaney | |
| 5,852,437 A | 12/1998 | Wugofski | |
| 5,909,518 A | 6/1999 | Chui | |
| 5,911,582 A | 6/1999 | Redford | |
| 5,960,012 A * | 9/1999 | Spracklen | .................. 714/807 |
| 5,977,933 A | 11/1999 | Wicher | |
| 6,031,940 A | 2/2000 | Chui | |
| 6,075,906 A | 6/2000 | Fenwick | |
| 6,097,441 A | 8/2000 | Allport | |
| 6,104,334 A | 8/2000 | Allport | |
| 6,141,059 A | 10/2000 | Boyce | |
| 6,141,447 A | 10/2000 | Linzer | |
| 6,222,885 B1 | 4/2001 | Chaddha | |
| 6,256,019 B1 | 7/2001 | Allport | |
| 6,263,503 B1 | 7/2001 | Margulis | |
| 6,323,854 B1 * | 11/2001 | Knox et al. | .................. 345/418 |
| 6,340,994 B1 | 1/2002 | Margulis | |

(Continued)

OTHER PUBLICATIONS

Skodras et al., "JPEG2000: The Upcoming Still Image Compression Standard," May 11, 2000, 14 pages.

(Continued)

Primary Examiner—Amare Mengistu
Assistant Examiner—Aaron M Guertin
(74) Attorney, Agent, or Firm—Eppa Hite

(57) ABSTRACT

A multi-display computer system comprises a host computer system that processes windowed desktop environments for multiple remote displays, multiple users or a combination of the two. For each display and for each frame, the multi-display processor responsively manages each necessary portion of a windowed desktop environment. The necessary portions of the windowed desktop environment are further processed, encoded, and where necessary, transmitted over the network to the remote display for each user. Embodiments integrate the multi-display processor with the graphics processing unit, network controller, main memory controller or a combination of the three. The encoding process is optimized for network traffic and special attention is made to assure that all users have low latency interactive capabilities.

14 Claims, 10 Drawing Sheets

U.S. PATENT DOCUMENTS

| | | | |
|---|---|---|---|
| 6,388,671 B1 * | 5/2002 | Yoshizawa et al. | 345/505 |
| 6,409,602 B1 | 6/2002 | Wiltshire | |
| 6,437,803 B1 | 8/2002 | Panasyuk | |
| 6,456,340 B1 | 9/2002 | Margulis | |
| 6,510,177 B1 | 1/2003 | De Bonet | |
| 6,600,838 B2 | 7/2003 | Chui | |
| 6,611,530 B1 | 8/2003 | Apostolopoulos | |
| 6,628,716 B1 | 9/2003 | Tan | |
| 6,658,019 B1 | 12/2003 | Chen | |
| 6,701,380 B2 | 3/2004 | Schneider | |
| 6,721,837 B2 | 4/2004 | MacInnis | |
| 6,754,266 B2 | 6/2004 | Bahl | |
| 6,757,851 B1 | 6/2004 | Park | |
| 6,768,775 B1 | 7/2004 | Wen | |
| 6,771,828 B1 | 8/2004 | Malvar | |
| 6,774,912 B1 | 8/2004 | Ahmed | |
| 6,781,601 B2 | 8/2004 | Cheung | |
| 6,785,700 B2 | 8/2004 | Masud | |
| 6,798,838 B1 | 9/2004 | Ngo | |
| 6,806,885 B1 * | 10/2004 | Piper et al. | 345/545 |
| 6,807,308 B2 | 10/2004 | Chui | |
| 6,816,194 B2 | 11/2004 | Zhang | |
| 6,826,242 B2 | 11/2004 | Ojard | |
| 6,834,123 B2 | 12/2004 | Acharya | |
| 6,839,079 B2 | 1/2005 | Barlow | |
| 6,842,777 B1 | 1/2005 | Tuli | |
| 6,847,468 B2 | 1/2005 | Ferriere | |
| 6,850,571 B2 | 2/2005 | Tardif | |
| 6,850,649 B1 | 2/2005 | Malvar | |
| 6,853,385 B1 | 2/2005 | MacInnis | |
| 6,868,083 B2 | 3/2005 | Apostolopoulos | |
| 6,898,583 B1 | 5/2005 | Rising | |
| 6,975,323 B1 * | 12/2005 | Yamamoto | 345/545 |
| 6,985,159 B2 * | 1/2006 | Brown | 345/611 |
| 7,383,341 B1 * | 6/2008 | Saito et al. | 709/228 |
| 7,446,775 B2 * | 11/2008 | Hara et al. | 345/519 |
| 2001/0021998 A1 | 9/2001 | Margulis | |
| 2003/0026398 A1 * | 2/2003 | Duran et al. | 379/93.21 |
| 2004/0201544 A1 * | 10/2004 | Love et al. | 345/1.1 |
| 2005/0204015 A1 | 9/2005 | Steinhart et al. | |
| 2006/0117371 A1 | 6/2006 | Margulis | |
| 2006/0164324 A1 * | 7/2006 | Polivy et al. | 345/1.1 |

OTHER PUBLICATIONS

Gary C. Kessler, "An Overview of TCP/IP Protocols and the Internet," InterNIC Document, Dec. 29, 2004, 42 pages.

Eric J. Balster, "Video Compression and Rate Control Methods Based on the Wavelet Transform," The Ohio State University, 2004, pp. 1-24.

Taubman et al., "Embedded Block Coding in JPEG2000," Feb. 23, 2001, pp. 1-8 of 36, Hewlett-Packard, Palo Alto CA.

Kulapala et al., "Comparison of Traffic and Quality Characteristics of Rate-Controlled Wavelet and DCT Video," Oct. 11, 2004, 6 pages, Arizona State University, Tempe AZ.

"Remote Desktop Protocol," Platform SDK: Terminal Services, Jun. 2005, 2 pages, Microsoft Corporation Web Site, Redmond WA.

"Matrox QID Pro" Jun. 2005, 3 pages, Matrox Graphics web site product specification, Matrox Electronic Systems Ltd, Dorval, Quebec, Canada.

Ian Griffiths, "A First Look at 3-D Support in Avalon," Jun. 2004, 11 pages, Microsoft Corporation Web Site, Redmond WA.

Wee et al., "Transcoding MPEG Video Streams in the Compressed Domain," HP Image and Data Compression Conference, Mar. 13, 1997, 10 pages, Hewlett-Packard, Palo Alto CA.

* cited by examiner

COMPUTER SYSTEM FOR SUPPORTING MULTIPLE REMOTE DISPLAYS

BACKGROUND OF THE INVENTION

1. Technical Field

The present invention relates generally to a multi-display system, and relates more particularly to an effective implementation of a multi-display processor system.

2. Discussion of Background Art

Developing efficient multi-display systems is a significant objective for contemporary system designers and manufacturers.

Conventional computer systems may utilize a display device to view the output from a host computer system. The conventional display device is typically positioned in local proximity to the host computer system because of restrictions imposed by various physical connections that electrically couple the display device to the output of the computer system. In some cases, computer systems may support a second display device that has similar proximity restrictions due to the physical connections.

Remote displays may advantageously provide users with additional flexibility when choosing an appropriate viewing location and appropriate locations for the host computer. For example, in a corporate environment, a business may wish to keep all of the host computers in a "Computer Room" that is a secure central location that has both physical security and environmental management such as air conditioning and power back-up systems. However, it is necessary for users to utilize the host computer systems from their offices and from desks located outside the "computer room."

The typical office environment today includes personal computers physically located at the users' locations. These personal computers operate on a network having a centralized system for storage, file serving, file sharing, network management and various administrative services. Recognizing the benefits of security, reduced cost of operation, and the general desire for centralizing control, various attempts have been made to reduce the complexity of the computer that resides at the user's location and evolve it into some type of thin client solution. The first portion of the system to be centralized is usually the hard drive, centralizing all of the storage associated with the computer system while the user still runs the operating system on his local desktop. There have been other attempts to centralize more of the computer by effectively turning a client into a dumb terminal, but dumb terminals tend to perform poorly especially for rich multimedia content.

Remote computing systems typically possess certain detrimental operational characteristics that diminish their effectiveness for use in modern computer systems. For example, in order to eliminate restrictive physical proximity connections, remote displays have to resort to ineffective means to transfer the display information from the host computer to the remote display. These ineffective means usually degrade real time performance for video playback and 3D graphics and typically substantially slow down the interactive performance for simple user interface controls.

Some thin client approaches effectively run long wires from the head end system. The long wires may be extensions of the PCI or PCI express bus, or may be some transport of the video display output in either analog or digital form. While the long wire approach can solve software issues for the thin client, it typically requires a special network for the long wires and the host computer can not scale to support many users. Systems that solve the delay issues by essentially lengthening wire implementations used by local proximity displays, end up requiring dedicated and costly wiring solutions.

Some thin clients at the user desktop have a CPU that runs an operating system and have a graphics controller. This makes the thin client, or remote terminal, a system that needs to be maintained with software updates and whose performance is bound by the component selection in the device, not just by the host CPU system. Systems that solve the delay issues by adding more intelligence to the remote display end up with remote systems that require significant processing, a full graphics subsystem including 2D, 3D and video playback, maintenance and system management that significantly reduce the primary justification for centralizing the host computers in the first place.

Effectively solving the issue of remote display systems is one of the key steps in supporting multiple displays from a single host computer. Multiple displays from a single host computer allow multiple users to utilize the resources of a single shared computer thus reducing cost. In a typical office environment, seldom is everyone using their computers at the same time and similarly, seldom is any one user using all of the computing resources of their computer. So for example, a company with 100 offices may only need a system that supports 60 users at any one time. Even with that said, such a system could be designed to support all 100 users giving them enough computing throughput to give the appearance that they each had their own host computer. With host computers ever increasing their performance and even including multiple CPUs and single CPUs that have multiple CPU cores, the limitation of a single user to a single computer makes less economic sense. In office environments such as telephone call centers, where the users are all running a common set of limited software applications, this approach can make sense for many users to share a single host computer.

However, because of the substantially increased complexity in achieving high performance for multiple remote displays, single host computer systems may require additional resources for effectively managing and controlling, and interactive operation of, multiple displays.

What is needed is a system, including a multi-display processor solution that allows a host computer and a network to be used for remote displays, which does not require each remote display to have a significant CPU, operating system, or graphics processor. The system should allow a host computer to economically scale to support numerous displays and numerous users while delivering an acceptable level of performance.

SUMMARY

The present invention provides an efficient architecture for a multi-display system. In one embodiment, initially, a multi-display computer system sharing one host computer system provides one or more remote display systems with interactive graphics and video capabilities. The host computer system generally manages frames that correspond to each remote display system and manages updating the remote display systems over a network connection. Three preferred embodiments discussed in detail, and many variations are discussed in lesser detail.

In a first preferred embodiment, a host computer utilizes some combination of software and conventional graphics processing blocks to support multiple displays. The graphics processor is configured for a very large frame size or some combination of frame sizes that are managed to correspond to the remote display systems. The software includes a tracking software layer that can track when the frame contents for each display, the surfaces or subframes that comprise each frame and potentially which precincts or blocks of each surface, are updated. The encoding process for the frames, processed surfaces or subframes, or precincts of blocks, can be performed by some combination of the CPU and one of the processing units of the graphics processor.

In a second preferred embodiment, a host computer utilizes a traditional graphics processor whose display output paths, normally utilized for local display devices, are connected to a multi-display processor. A combination of supporting local and remote displays is possible. For remote displays, the graphics processor is configured to output multiple frames over the display output path at the highest frame rate possible for the number of frames supported in any one instance. The multi-display processor, configured to recognize the frame configurations for each display, manages the display data at the frame, scan line, group of scan line, precinct, or block level to determine which remote displays need which subframe updates. The multi-display processor then encodes the appropriate subframes and prepares the data for transmission to the appropriate remote display system.

A third preferred embodiment integrates a graphics processor and a multi-display processor to optimize a system configuration. This integration allows for enhanced management of the display frames within a shared RAM where the graphics processor has more specific knowledge for each frame. Additionally, the sharing of RAM allows the multi-display processor to access the frame data directly to both manage the frame and subframe updates and to perform the data encoding based on efficient memory accesses. A system-on-chip implementation of this integrated or combined solution is described in detail.

In each system, after the data is encoded, a network processor, or CPU working in conjunction with a simpler network controller, transmits the encoded data over wired and/or wireless network(s) to a remote display system(s). Each remote display system decodes the data intended for its display, manages the frame updates and performs the necessary processing for the display screen. Other features, such as masking packets lost in network transmission, are managed by the remote display system(s). When there are no new frame updates, the remote display controller refreshes the display screen with the data from the prior frame.

The system may feed back network information from the various wired and wireless network connections to the host system CPU, frame management and data encoding systems. The host system uses the network information to affect the various processing steps of producing display frame updates and, based on the network feedback, can vary the frame rate and data encoding for different remote display systems. Additionally, for systems that include noisy transmission channels as part of the network system, the encoding step may be combined with forward error correction protection in order to prepare the transmit data for the characteristics of the transmission channel. The combination of these steps produces an optimal system for maintaining an optimal frame rate with low latency for each of the remote display systems.

Therefore, for at least the foregoing reasons, the present invention effectively implements a flexible multi-display system that utilizes various heterogeneous components to facilitate optimal system interoperability and functionality. The present invention thus efficiently implements an enhanced multi-display system.

DETAILED DESCRIPTION OF THE PREFERRED EMBODIMENT

The present invention relates to an improvement in multi-display computer systems. The generic principles herein may be applied to other embodiments, and various modifications to the preferred embodiment will be readily apparent to those skilled in the art. Thus, the present invention is not intended to be limited to the embodiment shown but is to be accorded the widest scope consistent with the principles and features described herein. While the described embodiments relate to multi-display computer systems, the same principles and features could be equally applied to a multi-display television system.

Figure 1:
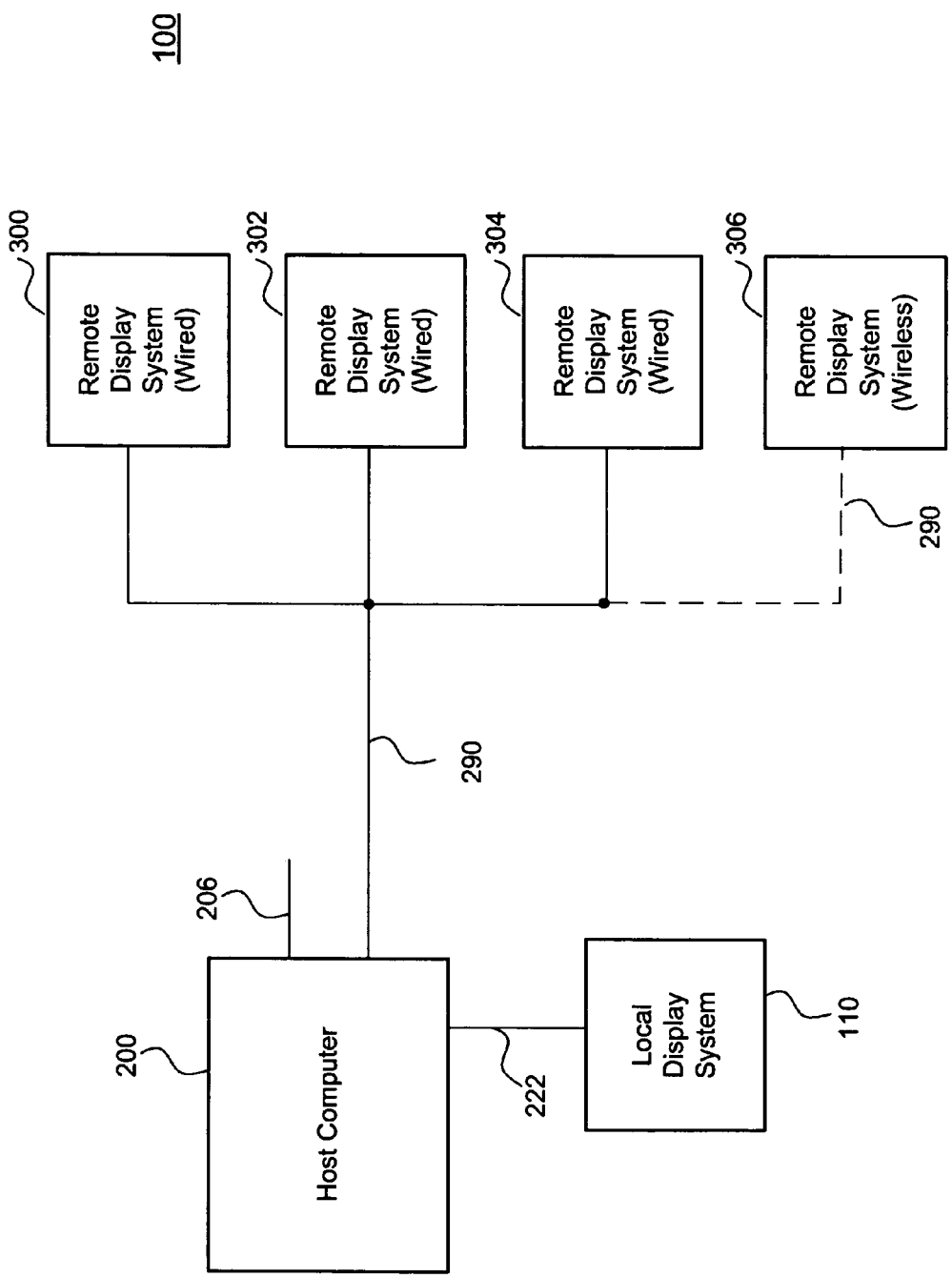
FIG. 1 is a block diagram of a multi-display computer system including a host computer, a network, and multiple remote display systems.

Referring to FIG. 1, the invention provides an efficient architecture for a multi-display computer system 100. A Host Computer 200 processes multiple windows desktop environments, typically one for each display, and, besides supporting local display 110, produces display update network streams over wired network(s) 290 to each of remote displays 300, 302, 304, etc., or over a wireless network 290 to display 306. For a multi-user system, users at the remote locations are able to time-share the host computer 200 as if it were their own local computer and have complete support for all types of graphics, text and video content with the same type of user experience that could be achieved on a local computer.

In a first preferred embodiment, a combination of software running on the CPU subsystem 202, programming a video processor or GPU, and managing a standard display controller can achieve a low cost method of supporting a number of remote display systems 300. This number of displays can be considerably in excess of that which the display controller can support locally via its output connections. The CPU configures graphics memory such that a primary surface for each remote display is accessible at least by the CPU and preferably also by the GPU. Operations that require secondary surfaces are performed in other areas of memory. Operations to secondary surfaces are followed by the appropriate transfers, either by the GPU or the CPU, into the primary surface area of the corresponding display. These transfers are necessary to keep the display controller of the graphics and display subsystem out of the path of generating new display frames. By utilizing the CPU and GPU to generate a display-ready frame as a part of the primary surface, the display controller is not in the path of generating the display update stream for the remote display systems 300-306. Instead, the CPU and GPU can manage the contents of the primary surface frames and provide those frames as input to a data encoding step performed by the video processor, another portion of the GPU or the CPU. The processing can preferably process the necessary blocks of each primary surface to produce encoded data for the blocks of the frames that require updates. Those encoded data blocks are then provided to the network controller 228 for transmission to the remote display systems 300. The process for transferring display updates from the host computer 200 to a remote display system 300 are further discussed below in conjunction with FIGS. 2 through 10.

Figure 2:
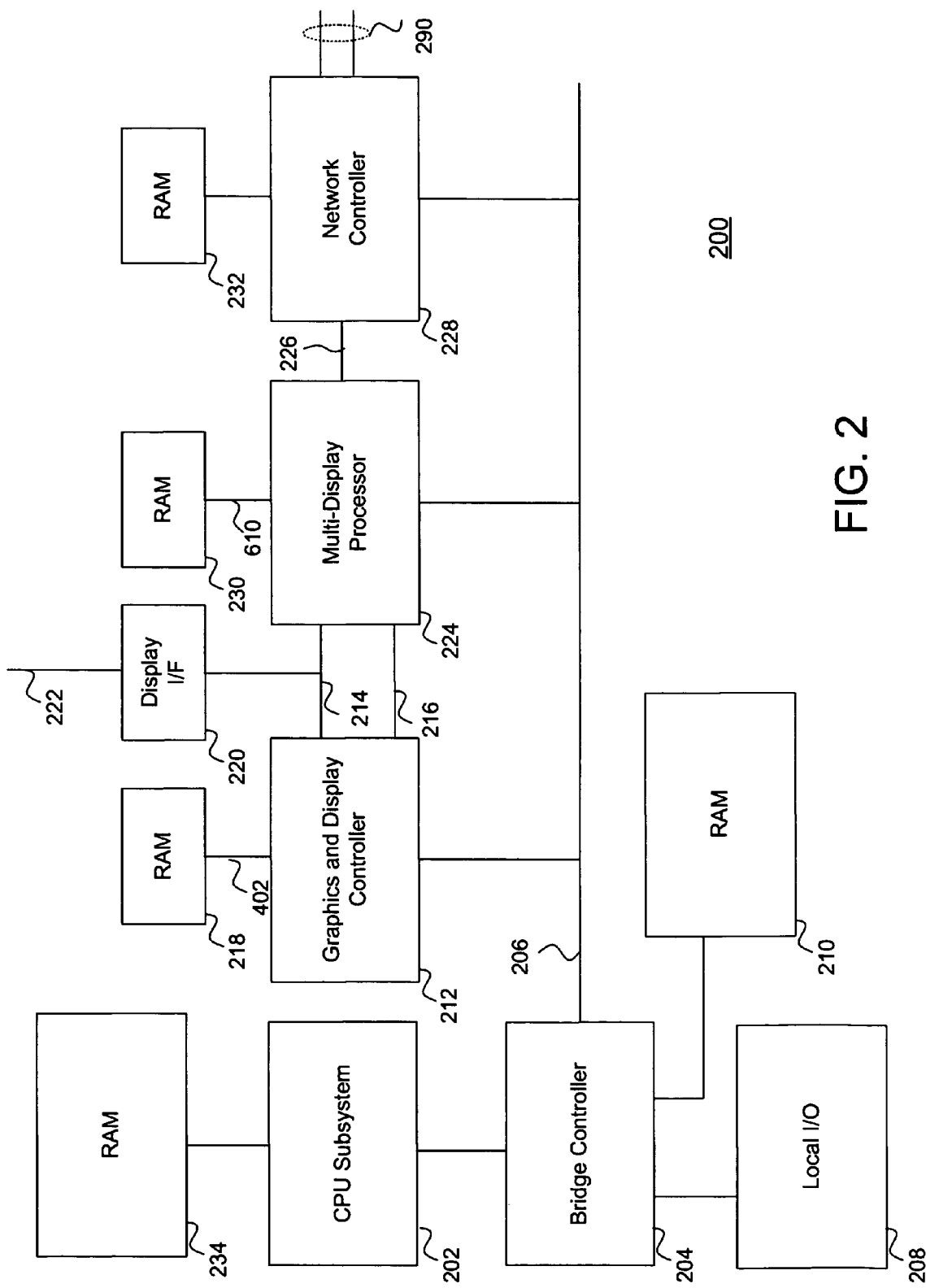
FIG. 2 is a block diagram of a host computer of a multi-display system in accordance with one embodiment of the invention.

FIG. 2 is a block diagram of a host computer 200 for a multi-display system 100 in accordance with a second embodiment of the invention. The basic components of host computer 200 preferably include, but are not limited to, a CPU subsystem 202, a bus bridge-controller 204, a main system bus 206 such as PCI express, local I/O 208, main RAM 210, and a graphics and display controller 212 having one or more dedicated output paths SDVO1 214 and SDVO2 216, and possibly its own memory 218. The graphics and display controller 212 may have an interface 220 that allows for local connection 222 to a local display 110. Host computer 200 also preferably includes a multi-display processor 224 that has both input paths SDV01 214 and SDV02 216 from the graphics and display controller 212 and an output path 226 to network controller 228. Instead of dedicated path 226, Multi-Display Processor 224 may be connected by the main system bus 206 to the Network Controller 228. The multi-display processor 224 may include a dedicated RAM 230 or may share main system RAM 210, graphics and display controller RAM 218 or network controller RAM 232. Those familiar with contemporary computer systems will recognize that the main RAM 210 may be associated more closely with the CPU subsystem 202 as shown at RAM 234. Alternatively the RAM 218 associated with the graphics and display controller 212 may be unnecessary as the host system 200 may share a main RAM 210.

The function of multi-display processor 224 is to receive one or more display refresh streams over each of SDVO1 214 and SDVO2 216, manage the individual display outputs, process the individual display outputs, track which portions of each display change on a frame-by-frame basis, encode the changes for each display, format and process what changes are necessary and then provide a display update stream to the network controller 228. Network controller 228 processes the display update stream and provides the network communication over one or more network connections 290 to the various display devices 300-306, etc. These network connections can be wired or wireless. The implementation and functionality of a multi-display system 100 are further discussed below in conjunction with FIGS. 3 through 10.

Figure 3:
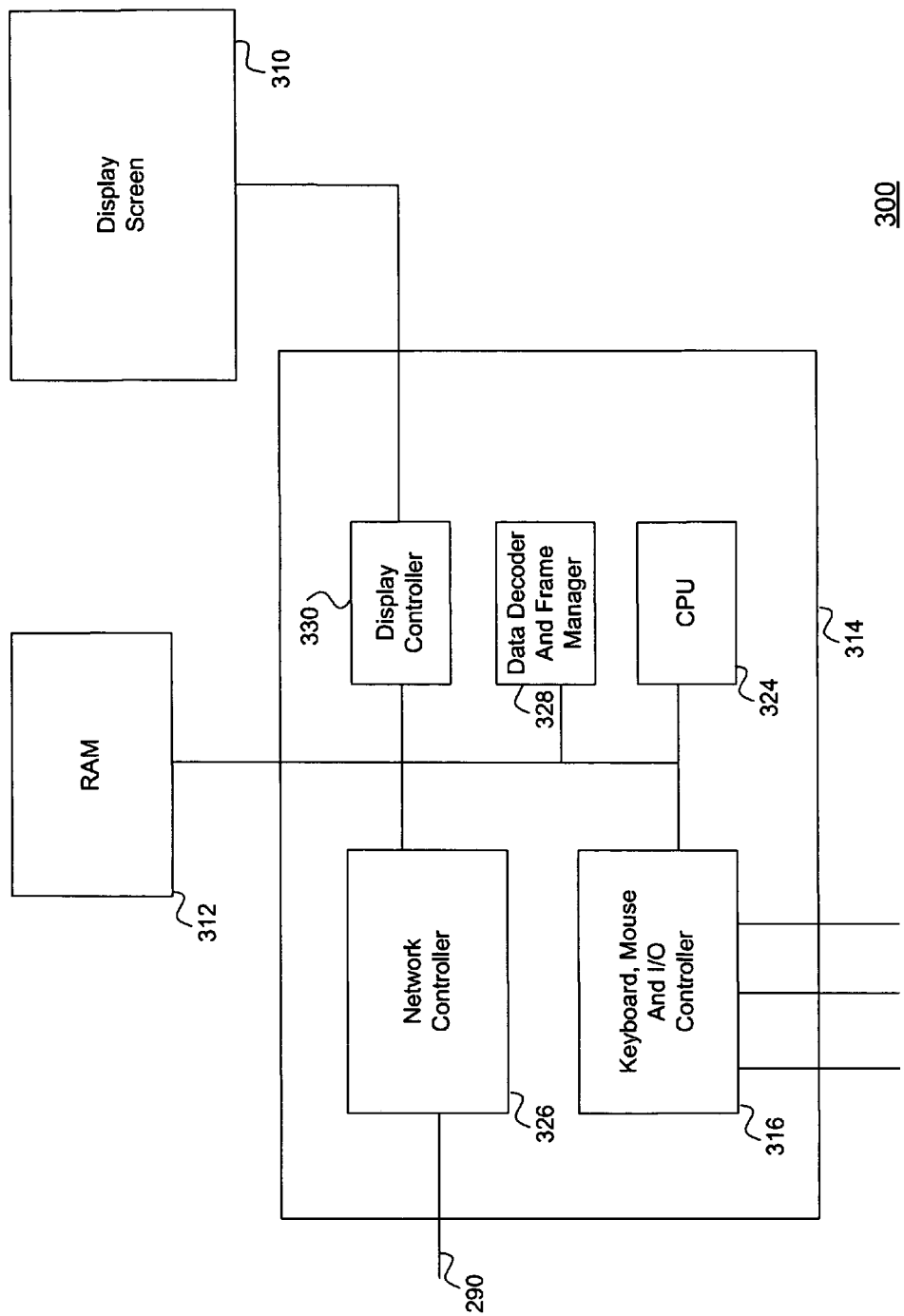
FIG. 3 shows a remote display corresponding to FIG. 2 in accordance with one embodiment of the invention.

FIG. 3 is a block diagram of a remote display system 300, in accordance with one embodiment of the invention, which preferably includes, but is not limited to, a display screen 310, a local RAM 312, and a remote display system controller 314. The remote display system controller 314 includes a keyboard, mouse and I/O control subsystem 316 which has corresponding connections for a mouse 318, keyboard 320 and other miscellaneous devices 322 such as speakers for reproducing audio or a USB connection which can support a variety of devices. The connections can be dedicated single purpose such as a PS/2 style keyboard or mouse connection, or more general purpose such as a Universal Serial Bus (USB). In another embodiment, the I/O could include a game controller, a local wireless connection, an IR connection or no connection at all. Remote display system 300 may also include other peripheral devices such as a DVD drive.

Some embodiments of the invention do not require any inputs at the remote display system 300. An example of such a system is a retail store or an electronic billboard where different displays are available at different locations and can show variety of informative and entertaining information. Each display can be operated independently and can be updated based on a variety of factors. A similar system could also include some displays that accept touch screen inputs as part of the display screen, such as an information kiosk.

In a preferred environment, the software that controls the I/O device is standard software that runs on the host computer and is not specific to the remote display system. The fact that the I/O connection to the host computer is supported over a network is made transparent to the device software by a driver on the host computer and by some embedded software running on the local CPU 324. Network controller 326 is also configured by local CPU 324 to support the transparent I/O control extensions.

The transparency of the I/O extensions can be managed according to the administrative preferences of the system manager. For example, one of the goals of the system may be to limit the ability of remote users to capture or store data from the host computer system. As such, it would not be desirable to allow certain types of devices to plug into a USB port at the remote display system 300. For example, a hard drive, a flash storage device, or any other type of removable storage would compromise data stored on the host computer 200. Other methods, such as encrypting the data that is sent to the remote display system 300, can be used to manage which data and which user has access to which types of data.

In addition to the I/O extensions and security, the network controller 326 supports the protocols on the network path 290 where the networks supported could be wired or wireless. The networks supported for each remote display system 300 need to be supported by the FIG. 2 network controller 228 either directly or through some type of network bridging. A common network example is Ethernet, such as CAT 5 wiring running some type of Ethernet, preferably gigabit Ethernet, where the I/O control path may use an Ethernet supported protocol such as standard Transport Control Protocol and Internet Protocol (TCP/IP) or some form of lightweight handshaking in combination with UDP transmissions.

In addition to the packets for supporting the I/O devices, the network carries the encoded display data required for the display where the data decoder and frame manager 328 and the display controller 330 are used to support all types of visual data representations that may be rendered at the host computer and display them locally on display screen 310.

The display controller 330, data decoder and frame manager 328, and CPU 324 work together to manage a representation of the current image frame in the RAM 312 and to display the image on the display 310. Typically, the image will be stored in RAM 312 in a format ready for display, but in systems where the RAM cost is an issue, the image can be stored in the encoded format. When stored in an encoded format, in some systems, the external RAM 312 may be replaced by large buffers within the remote display system controller 314.

After the display is first initialized, the host computer 200 provides a full frame of data for decode and display over the network. Following that first frame of display data, the host computer 200 need only send partial frame information over the network 290 as part of the display update network stream. If none of the pixels of a display are changed from the prior frame, the display controller 330 can refresh the display screen 310 with the prior frame contents from the local storage. When partial frame updates are sent in the display update network stream, the CPU 324 and the display data decoder 328 perform the necessary processing steps to decode the image data and update the appropriate area of RAM 312 with the new image. During the next refresh cycle, the display controller 330 will use this updated frame for display screen 310. The processing for conversion and storage of the display update network stream is described in further detail with respect to FIGS. 4 through 10 below.

Figure 4:
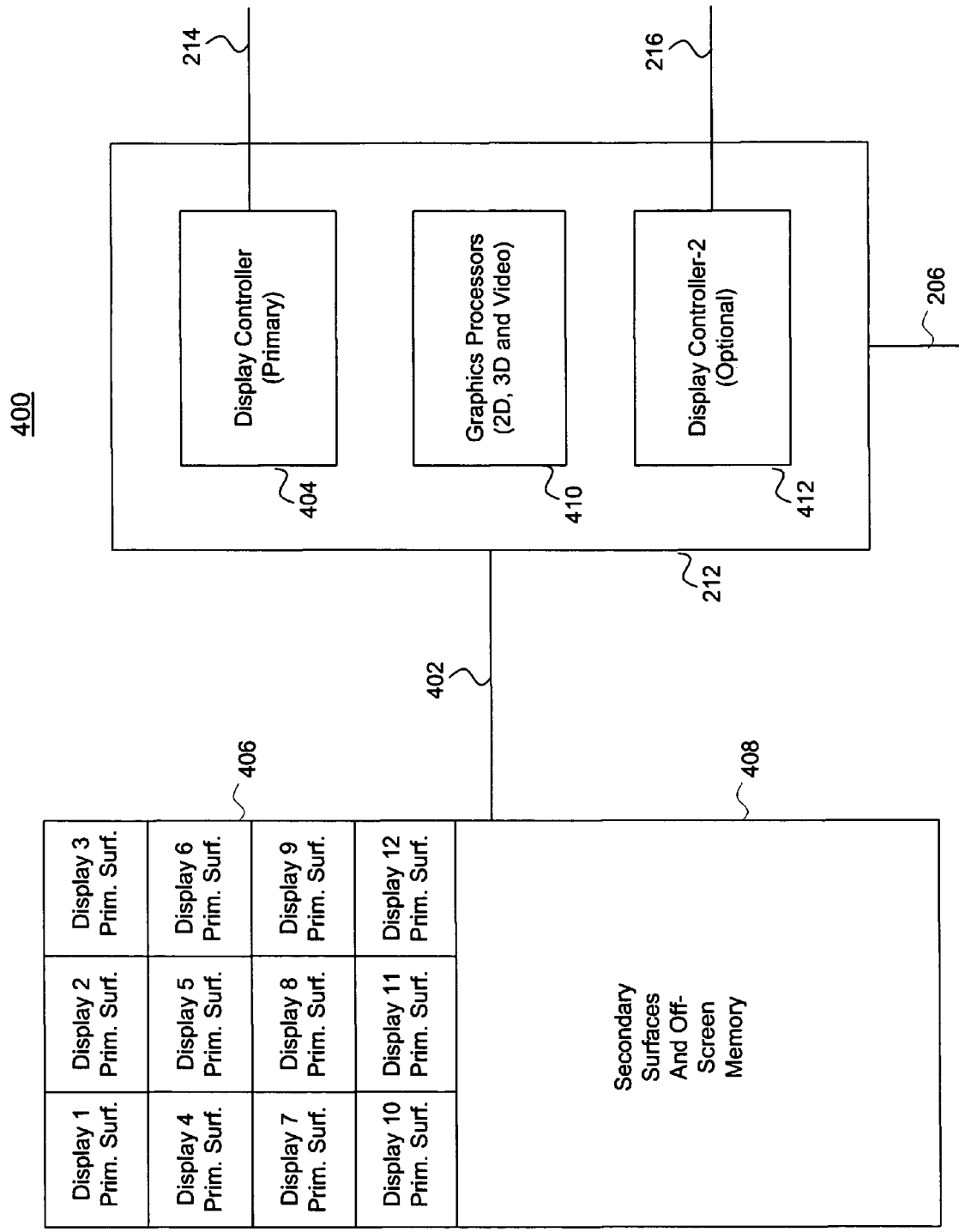
FIG. 4 represents a memory organization and the path through a dual display controller portion of a graphics and display controller in accordance with one embodiment of the invention.

This embodiment of host computer 200 supports multiple remote display systems 300-306 with what is conventionally associated with a single graphics and display controller 212 and a single SDVO connection. The method of multi-user and multi-display management is represented in FIG. 4 by RAM 218 data flowing through path 402 and the display controller portion 404 of the graphics and display controller 212 to the output connections SDVO1 214 and SDVO2 216.

For illustration purposes, RAM 218 is shown organized into various surfaces each containing display data for multiple displays. The primary surfaces 406, Display 1 through Display 12, are illustrated with a primary surface resolution that happens to match the display resolution for each display. This is for illustrative purposes though there is no requirement for the display resolution to be the same resolution as that of the primary surface. The other area 408 of RAM 218 is shown containing secondary surfaces for each display and supporting off-screen memory. The RAM 218 will typically be a common memory subsystem for display and graphics subsystem 212, though the RAM may also be shared with main system memory 210 or with the memory of another processor in the system 100. In a shared memory system, contention may be reduced if there are available multiple concurrent memory channels for accessing the memory. The path 402 from RAM 218 to the graphics and display controller 212 may be time-shared.

The graphics and display controller 212's 2D, 3D and video graphics processors 410 are preferably utilized to achieve high graphics and video performance. The graphics processing units may include 2D graphics, 3D graphics, video encoding, video decoding, scaling, video processing and other advanced pixel processing. The display controllers 404 and 412 may also include processing units for performing functions such as blending and keying of video and graphics data, as well as overall screen refresh operations. In addition to the RAM 218 used for the primary and secondary display surfaces, there is sufficient off-screen memory to support various 3D and video operations. The display controllers will typically combine the primary surface with one or more secondary surfaces to support the display output of a composite frame, though it is also possible for the graphics processors 410 to perform the compositing into a single primary surface.

In a single-display system, display controller 404 would be configured to access RAM 218, process the data and output a proper display resolution and configuration over output SDVO1 214 for a single display device. Preferably, the display controller 404 is configured for a display size that is much larger than a single display to thereby accommodate multiple displays. Assuming the display controller 404 of a typical graphics and display controller 212 was not specifically designed for a multi-display system, the display controller 404 can typically only be configured for one display output configuration at a time. It however may be practical to consider display control 404 to be configured to support an oversized single display as that is often a feature used by "pan and scan" display systems and may be just a function of setting the counters in the display control hardware.

In the illustration of FIG. 4, consider that each display primary surface represents a 1024×768 primary surface corresponding to a 1024×768 display. Stitching together six 1024×768 displays, three across and two down, would require display controller 212 to be configured to three times 1024, or 3072 pixels of width, by two times 768, or 1536 pixels of height. Such a configuration would accommodate Displays 1 through 6.

Display controller 404 would treat the six tiled displays as one large display and provide the scan line based output to SDVO1 output 214 to the multi-display processor 224. Where desired, display controller 404 would combine the primary and secondary surfaces for each of the six tiled displays as one large display. The displays labeled 7 through 12 could similarly be configured as one large display for Display Controller 2 412 through which they would be transferred over SDVO2 216 to the multi-display processor 224.

Figure 6:
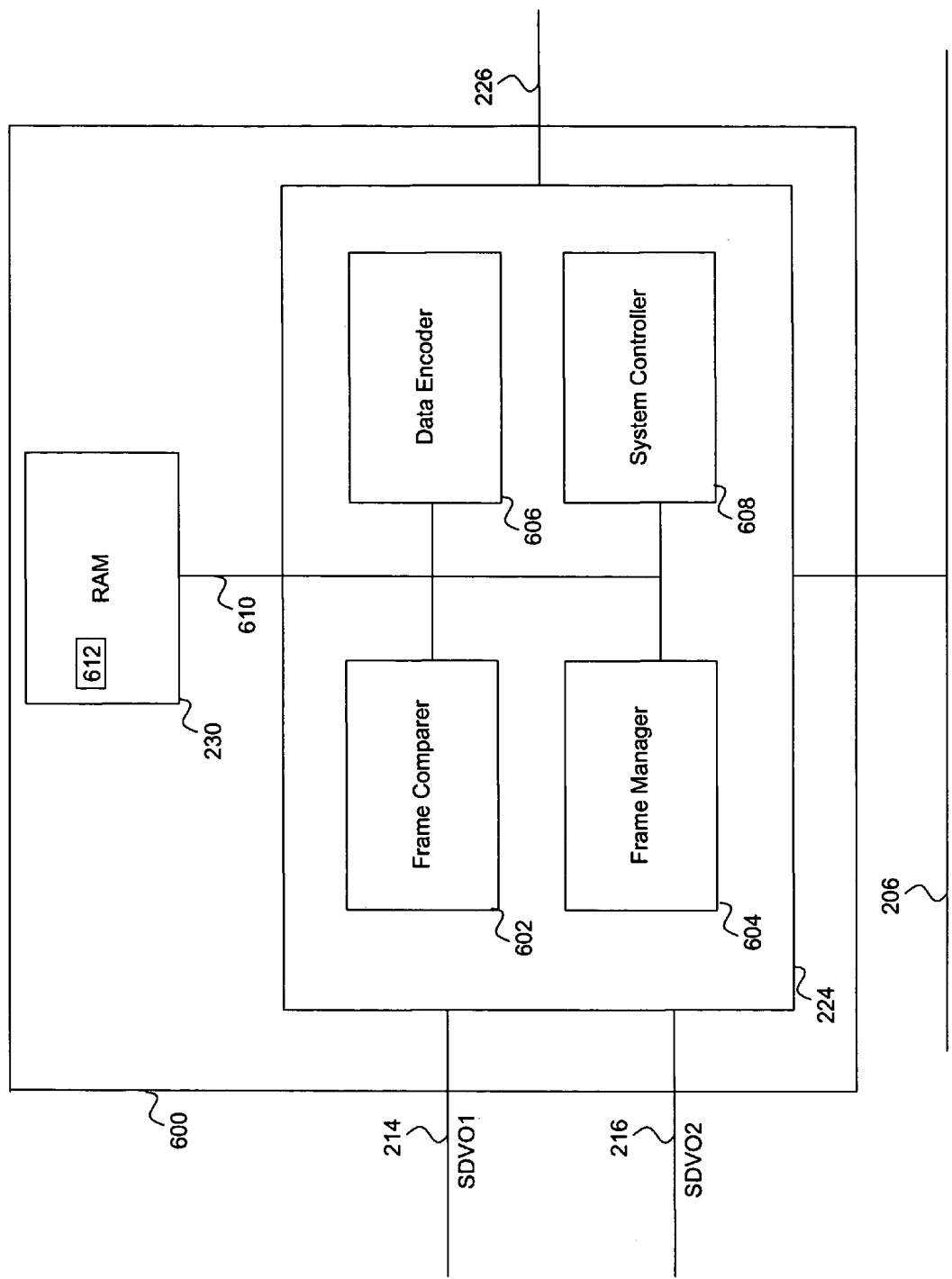
FIG. 6 shows a multi-display processor for the head end system of FIG. 2 in accordance with one embodiment of the invention.

In a proper configuration, FIG. 6 multi-display processor 224 manages the six simultaneous displays properly and process as necessary to demultiplex and capture the six simultaneous displays as they are received over SDVO1 214.

In the FIG. 4 primary surface 406, the effective scan line is three times the minimum tiled display width, making on-the-fly scan line based processing considerably more expensive.

In a preferred environment for on-the-fly scan line based processing, the display controller 404 is configured to effectively stack the six displays vertically in one plane and treat the tiled display as a display of resolution 1024 pixels horizontally by six times 768, or 4608, pixels vertically. To the extent it is possible with the flexibility of the graphics subsystem, it is best to configure the tiled display in this vertical fashion to facilitate scan line based processing. Where it is not possible to configure such a vertical stacking, and instead a horizontal orientation needs to be included, it may be necessary to only support precinct based processing where on-the-fly encoding is not done. In order to minimize latency, when the minimum number of lines has been scanned, the precinct based processing can begin and effectively be pipelined with additional scan line inputs.

Figure 5:
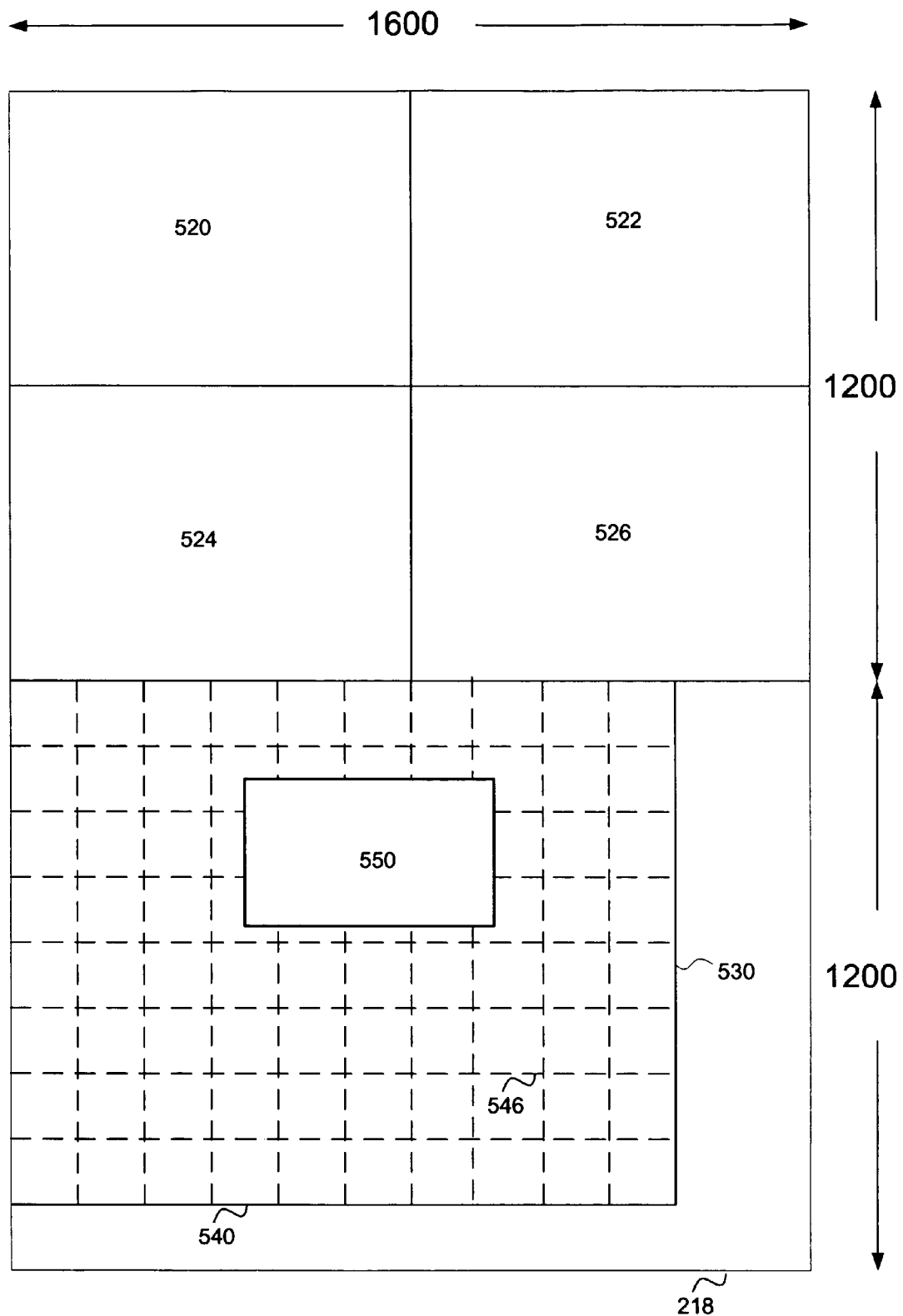
FIG. 5 represents a memory and display organization for various display resolutions, in accordance with one embodiment of the invention.

FIG. 5 shows a second configuration where the tiled display is set to 1600 pixels horizontally and two times 1200 pixels or 2400 pixels vertically. Such a configuration would be able to support two remote display systems 300 of resolution 1600×1200 or eight remote displays of 800×600 or a combination of one 1600×1200 and four 800×600 displays. FIG. 5 shows the top half of memory 218 divided into four 800×600 displays labeled 520, 522, 524 and 526.

Additionally, the lower 1600×1200 area could be sub-divided to an arbitrary display size smaller than 1600×1200. As delineated with rectangle sides 530 and 540, a resolution of 1280×1024 can be supported within a single 1600×1200 window size. Because the display controller 404 is treating the display map as a single display, the full rectangle of 1600×2400 would be output and it would be the function of the multi-display controller 224 to properly process a sub-window size for producing the display output stream for the remote display system(s) 300-306. A typical high quality display mode would be configured for a bit depth of 24 bits per pixel, though often the configuration may utilize 32 bits per pixel as organized in RAM 218 for easier alignment and potential use of the extra eight bits for other purposes when the display is accessed by the graphics and video processors.

FIG. 5 also illustrates the arbitrary placement of a display window 550 in the 1280×1024 display. The dashed lines 546 of the 1280×1024 display correspond to the precinct boundaries assuming 128×128 precincts. While in this example the precinct edges line up with the resolution of the display mode, such alignment is not necessary. As is apparent from display window 550 the alignment of the display window boundaries does not line up with the precinct boundaries. This is a typical situation as a user will arbitrarily size and position a window on a display screen. In order to support remote screen updates that do not require the entire frame to be updated, all of the precincts that are affected by the display window 550 need to be updated. Furthermore, the data type within the display window 550 and the surrounding display pixels may be of completely different types and not correlated. As such, the precinct based encoding algorithm, if it is lossy, needs to assure that there are no visual artifacts associated with either the edges of the precincts or with the borders of the display window 550. The actual encoding process may occur on blocks that are smaller, such as 16×16, than the precincts.

The illustration of the tiled memory is conceptual in nature as a view from the display controller 404 and display controller-2 412. The actual RAM addressing will also relate to the memory page sizes and other considerations. Also, as mentioned, the memory organization is not a single surface of memory, but multiple surfaces, typically including an RBG surface for graphics, a YUV surface for video, and an area of double buffered RGB surfaces for 3D. The display controller combines the appropriate information from each of the surfaces to composite a, single image. The compositing may also include alpha blending, transparency, color keying, overlay and other similar functions to combine the data from the different planes. In Microsoft Windows XP terminology, the display can be made up of a primary surface and any number of secondary surfaces. The FIG. 4 sections labeled Display 1 through Display 12 can be thought of as primary surfaces 406 whereas the secondary surfaces 408 are managed in the other areas of memory. Surfaces are also sometimes referred to as planes.

The 2D, 3D and video graphics processors 410 would control each of the six displays independently with each possibly utilizing a windowed user environment in response to the display requests from each remote display system 300. This could be done by having the graphics and video operations performed directly into the primary and secondary surfaces, where the display controller 404 composites the surfaces into a single image. Another example is to primarily use the primary surfaces and to perform transfers from the secondary surfaces to the primary surfaces. As long as the transfers are coordinated to occur at the right times, adverse display conditions associated with non-double buffered displays can be minimized. The operating system and driver software may allow for some of the more advanced operations for combining primary and secondary surfaces to not be supported by indicating to the software that such advanced functions, such as transparency, are not available functions.

In a typical prior art system, a display controller 404 would be configured to produce a refresh rate corresponding to the refresh rate of a local display. A typical refresh rate may be between 60 and 85 Hz though possibly higher and is somewhat dependent on the type of display and the phosphor or response time of the physical display elements within the display. Because the graphics and display controller 212 is split over a network from the actual display device 310, screen refreshing needs to be considered for this system partitioning.

Considering the practical limitations of the SDVO outputs from an electrical standpoint, a 1600×1200×24 configuration at 76 Hz is approximately a 3.5 Gigabits per second data rate. Increasing the tiled display to two times the height would effectively double the data and would require cutting the refresh rate in half to 38 Hz to still fit in a similar 3.5 Gigabits per second data rate. Because in this configuration the SDVO output is not directly driving the display device, the refresh requirements of the physical display elements of the display devices are of no concern. The refresh requirements can instead be met by the display controller 330 of the remote display controller 314.

Though not related to the refresh rate, the display output rate for the tiled display configuration is relevant to the maximum frame rate of new unique frames that can be supported and it is one of the factors contributing to the overall system latency. Since full motion is often considered to be 30 frames per second, the example configuration discussed here at 36 Hz could perform well with regard to frame rate. In general, the graphics and video drawing operations that write data into the frame buffer are not aware of the refresh rate at which the display controller is operating. Said another way, the refresh rate is software transparent to the graphics and video drawing operations.

Each display refresh stream output on SDV01 214 includes data to indicated which display is the target recipient of the update and where within the display (which precincts for systems that are precinct based) the new updated data is intended for, and includes the encoded data for the display.

Note that in FIG. 5, the window indicated by box 550 does not align with the drawn precincts and may or may not align with blocks of a block-based encoding scheme. Some encoding schemes will allow arbitrary pixel boundaries for an encoding subframe. For example, if the window 550 utilizes text and the encoding scheme utilized RLE encoding, the frame manager can set the sub frame parameters for the window to be encoded to exactly the size of the window. When the encoded data is sent to the remote display system, it will also include both the window size and a window origin so that the Data Decoder and Frame Manager 328 can determine where to place the decoded data into a decoded frame.

If the encoding system used does not allow for arbitrary pixel alignment, then the pixels that extend beyond the highest block size boundary either need to be handled with a pixel based encoding scheme, or the sub frame size can be extended beyond the window 550 size. The sub frame size should only be extended if the block boundary will not be evident by separately compressing the blocks that extend beyond the window.

Assuming window 550 is generated by a secondary surface overlay, the software tracking layer can be useful for determining when changes are made to subsequent frames. Even though the location of the secondary surface is known, because of various overlay and keying possibilities, the data to be encoded should come from stage after the overlay and keying steps are performed by either one of the graphics engines or by the display processor.

FIG. 6 is a block diagram of the multi-display processor subsystem 600 which includes the multi-display processor 224 and the RAM 230 and other connections 206, 214, 216 and 226 from FIG. 2. The representative units within the multi-display processor 224 include a frame comparer 602, a frame manager 604, a data encoder 606, and system controller 608. These functional units are representative of the processing steps performed and could be performed by a multi-purpose programmable solution, a DSP or some other type of processing hardware.

Though the preferred embodiment is for multiple displays, for the sake of clarity, this disclosure will first describe a system with a single remote display screen 310. For this sample remote display, the remote display system 300, the graphics and display controller 212 and the multi-display processor 224 are all configured to support a common display format typically defined as a color depth and resolution. Configuration is performed by a combination of existing and enhanced protocols and standards including digital display control (DDC), and Universal Plug and Play (uPNP), and utilizing the multi-display support within the Windows or Linux operating systems, and may be enhanced by having a management setup and control system application.

The graphics and display controller 212 provides the initial display data frame over SDVO1 214 to the multi-display processor 224 where the frame manager 604 stores the data over path 610 into the user display portion 612 of memory 230. Frame manager 604 keeps track of the display and storage format information for the frames of display data. When the subsequent frames of display data are provided over SDVO1 214, the frame comparer 602 comparers the subsequent frame data to the just prior frame data already stored in RAM 230. The prior frame data is read from RAM over path 610. The new frame of data may either be compared as it comes into the system on path 214, or may be first stored to memory by the frame manager 604 and then read by the frame comparer 602. Performing the comparison as the data comes in saves the memory bandwidth of an additional write and read to memory and may be preferred for systems where memory bandwidth is an issue. This real time processing is referred to as "on the fly" and may be a preferred solution for reduced latency.

The frame compare step identifies which pixels and regions of pixels have been modified from one frame to the next. Though the comparison of the frames is performed on a pixel-by-pixel basis, the tracking of the changes from one frame to the next is typically performed at a higher granularity. This higher granularity makes the management of the frame differences more efficient. In one embodiment, a fixed grid of 128×128 pixels, referred to as a precinct, may be used for tracking changes from one frame to the next. In other systems the precinct size may be larger or smaller and instead of square precincts, the tracking can also be done on the basis of a rectangular region, scan line or a group of scan lines. The block granularity used for compression may be a different size than the precinct and they are somewhat independent though the minimum precinct size would not likely be smaller than the block size.

The frame manager 604 tracks and records which precincts or groups of scan lines of the incoming frame contain new information and stores the new frame information in RAM 230, where it may replace the prior frame information and as such will become the new version of prior frame information. Thus, each new frame of information is compared with the prior frame information by frame comparer 602. The frame manager also indicates to the data encoder 606 and to the system controller 608 when there is new data in some of the precincts and which ones those precincts are. From an implementation detail, the new data may be double-buffered to assure that data encoder 606 accesses are consistent and predictable. In another embodiment where frames are compared on the fly, the data encoder may also compress data on the fly. This is particularly useful for scan line and multi-scan line based data compression.

For block based data encoding the data encoder 606 accesses the modified precincts of data from RAM 230 and compresses the data. System controller 608 keeps track of the display position of the precincts of encoded data and manages the data encoding such that a display update stream of information can be provided via the main system bus 206 or path 226 to the network controller. Because the precincts may not correspond to any particular display surface, in the preferred embodiment any precinct can be independently encoded without concern for creating visual artifacts between precincts or on the edges of the precincts. However, depending on the type of data encoding used, the data encoder 606 may require accessing data beyond the changed precincts in order to perform the encoding steps. Therefore, in order to perform the processing steps of data encoding, the data encoder 606 may access data beyond just the precincts that have changed. Lossless encoding systems should never have a problem with precinct edges.

A further enhanced system does not need to store the prior frame in order to compare; on-the-fly. Consider a system that includes eight line buffers for the incoming data and contains storage for a checksum associated with each eight lines of the display from the prior frame. A checksum is a calculated number that is generated through some hashing of a group of data. While the original data can not be reconstructed from the checksum, the same input data will always generate the same checksum, whereas any change to the input data will generate a different checksum. Using 20 bits for a checksum gives two raised to the twentieth power, or about one million, different checksum possibilities. This means there would be about a one in a million chance of an incorrect match. The number of bits for the checksum can be extended further if so desired.

In this further enhanced system, each scan line is encoded on the fly using the prior seven incoming scan lines and the data along the scan line as required by the encoding algorithm. As each group of eight scan lines is received, the checksum for that group is generated and compared to the checksum of those same eight lines from the prior frame. If the checksum of the new group of eight scan lines matches the checksum of the prior frame's group of eight scan lines, then it can be safely assumed that there has been no change in display data for that group of scan lines, and the system controller 608 can effectively abort the encoding and generation and transmission of the display update stream for that group of scan lines. If after receiving the eight scan lines, the checksums for the current frame and the prior frame are different, then that block of scan lines contains new display data and system controller 608 will encode the data and generate the display update stream information for use by the network controller 228 in providing data for the new frame of a remote display. In order to improve the latency, the encoding and check sum generation and comparison may be partially overlapped or done in parallel.

When the prior frame data is not used in the encoding, the encoding step uses one of any number of existing or enhanced versions of known lossy or lossless two dimensional compression algorithms, including but not limited to Run Length Encoding (RLE), Wavelet Transforms, Discrete Cosign Transform (DCT), vector quantization (VQ) and Huffman Encoding. Different types of content benefit to different extents based on the encoding scheme chosen. For example, frames of video images contain varying colors but not a lot of sharp edges, which is fine for DCT based encoding schemes, whereas text includes a lot of white space between color changes, but has very sharp edge transitions that need to be maintained for accurate representation of the original image where DCT would not be the most efficient encoding scheme. The amount of compression required will also vary based on various system conditions such as the network bandwidth available and the resolution of the display.

For systems that include the prior frame data as part of the encoding process, more sophisticated three dimensional compression techniques can be used where the third dimension is the time domain of multiple frames. Such enhancements for time processing include various block matching and block motion techniques which can differ in the matching criteria, search organization and block size determination.

While the discussion of FIG. 6 primarily described the method for encoding data for a single display, FIG. 6 also indicates a second display input path SDVO2 216 that can perform similar processing steps for a second display input from a graphics and display controller 212, or from a second graphics and display controller (not shown). Advanced graphics and display controllers 212 are designed with dual SDVO outputs in order to support dual displays for a single user or to support very high resolution displays where a single SDVO port is not fast enough to handle the necessary data rate. The processing elements of the multi-display processor including the frame comparer 602, the frame manager 604, the data encoder 606 and the system controller 608 can either be shared between the dual SDVO inputs, or a second set of the needed processing units can be included. If the processing is performed by a programmable DSP or Media Processor, either a second processor can be included or the one processor can be time multiplexed to manage both inputs.

The multi-display processor 224 outputs a display update stream to the FIG. 2 network controller 228 which in turn produces a display update network stream at one or more network interfaces 290. The networks may be of similar or dissimilar nature but through the combination of networks, each of the remote display systems 300-306, etc., is accessible. High speed networks such as Gigabit Ethernet are preferred but are not always practical. Lower speed networks such as 10/100 Ethernet, Power Line Ethernet, Coax cable based Ethernet, phone line based Ethernet or wireless Ethernet standards such as 802.11a, b, g, n, s and future derivatives can also be supported. Other non-Ethernet connections are also possible and can include USB, 1394a, 1394b, 1394c or other wireless protocols such as Ultra Wide Band (UWB) or WiMAX.

The various supported networks can support a variety of transmission schemes. For example, Ethernet typically supports protocols such as standard Transport Control Protocol and Internet Protocol (TCP/IP), UDP or some form of lightweight handshaking in combination with UDP transmissions. The performance of the network connection will be one of the critical factors in determining what resolution, color depth and frame rate can be supported for each remote display system 300-306.

The remote display performance can be optimized by matching the network performance and the display encoding dynamically in real time. For example, if the network congestion on one of the connections for one of the remote display systems increases at a point in time, the multi-display processor can be configured dynamically to reduce the data created for that remote display. When such a reduction becomes necessary, the multi-display processor can reduce the display stream update data in various ways with the goal of having the least offensive effect on the quality of the display at the remote display system. Typically, the easiest adjustment is to lower the frame rate of display updates.

It is not typically possible or desirable to dynamically adjust the set-up of display resolution mode or display color depth mode of the remote display system as it would require a reconfiguration of the display and the user would clearly find such as adjustment offensive. However, depending on the data encoding method used, the effective resolution and effective color depth within the existing display format can be adjusted without the need to reconfigure the display device and with a graceful degradation of the display quality.

Graceful degradation of this kind takes advantage of some of the characteristics of the human visual system's psycho visual acuity where, when there some more changes and motion in the display, the psycho visional acuity is less sensitive to the sharpness of the picture. For example, when a person scrolls through a text document, his eye cannot focus on the text as well as when the text is still, so that if the text blurred slightly during scrolling, it would not be particularly offensive. Since the times of the most display stream updates correspond to the added motion on the display, it is at those times it may be necessary to reduce the sharpness of the transmitted data in order to lower the data rate. Such a dynamic reduction in sharpness can be accomplished with a variety of encoding methods, but is particularly well suited for Wavelet Transform based compression where the image is subband coded into different filtered and scaled versions of the original image. This will be discussed in further detail with respect to FIG. 8.

Multi-display processor 224 will detect when a frame input over the SDVO bus intended for a remote display system is unchanged from the prior frame for that same remote display system. When such a sequence of unchanged frames is detected by the frame comparer 602, the data encoder 606 does not need to perform any encoding for that frame, the network controller 228 will not generate a display update network stream for that frame, and the network bandwidth is conserved as the data necessary for displaying that frame already resides in the RAM 312 at the remote display system 300. Similarly, no encoding is performed and no network transmission is performed for identified precincts or groups of scan lines that the frame manager 604 and frame comparer 602 are able to identify as unchanged. However, in each of these cases, the data was sent over the SDVO bus and may have been stored and read from RAM 230.

These SDVO transmissions and RAM movements would not be necessary if the host computer 200 were able to track which display frames are being updated. Depending on the operating system it is possible for the CPU 202 to track which frames for which displays are being updated. There are a variety of software based remote display Virtual Network Computing (VNC) products which use software to reproduce the look of the display of a computer and can support viewing from a different type of platform and over low bandwidth connections. While conceptually interesting, this approach does not mimic a real time response or support multi-media operations such as video and 3D that can be supported by this preferred embodiment. However, a preferred embodiment of this invention can use software, combined with the multi-display processor hardware, to enhance the overall system capabilities.

Various versions of Microsoft Windows operating systems use Graphics Device Interface (GDI) calls for operations to the Graphics and Display controller 212. Similarly, there are Direct Draw calls for controlling the primary and secondary surface functions, Direct 3D calls for controlling the 3D functions, and Direct Show calls for controlling the video playback related functions. Providing a tracking software layer that either intercepts the various calls, or utilizing other utilities within the display driver architecture, can enable the CPU 202 to track which frames of which remote display system are being updated. By performing this tracking, the CPU can reduce the need to send unchanged frames over the SDVO bus. It would be further advantageous if the operating system or device driver support provided more direct support for tracking which displays, which frames and which precincts within the frame had been modified. This operating system or device driver information could be used in a manner similar to the method described for the tracking software layer.

In a preferred embodiment, the CPU 202 can process data for more remote display systems than the display control portion of the graphics and display controller 212 is configured to support at any one time. For example, in the tiled display configuration for twelve simultaneous remote display systems of FIG. 4, additional displays could be swapped in and out of place of displays one through twelve based on the tracking software layer. If the tracking software detected that no new activity had occurred for display 5, and that a waiting list display 13 (not shown) had new activity, then CPU 202 would swap out display 13 in the place of display 5 in the tiled display memory area. CPU 202 may use the 2D processor of the 2D, 3D and video graphics processors 410 to perform the swapping. A waiting list display 14 (not shown) could also replace another display such that the twelve shown displays are essentially display positions in and out of which the CPU 202 can swap an arbitrary number of displays. The twelve position illustration is arbitrary and the system 100 could use as few as one and as many positions as the mapping of the display sizes allows.

There are several considerations for using a tracking software layer for such a time multiplexing scheme. The display refresh operation of display controller-1 404 is asynchronous to the drawing by the 2D/3D and Video Processors 410 as well as asynchronous to the CPU 202 processes. This asynchronism makes it difficult for the multi-display processor 224 to determine from the SDVO data if a display in the tiled display memory is the pre-swap display or the post-swap display. Worse, if the swap occurred during the read out of the tiled display region being swapped, it would be possible for corrupted data to be output over SDVO. Synchronizing the swapping with the multi-display processor 224 will require some form of semaphore operation, atomic operation, time coordinated operation or software synchronization sequence.

The general software synchronization sequence is to inform the multi-display processor 224 that the display in (to use the example just above) position 5 is about to be swapped and to not use the data from that position. The multi-display processor could still utilize data from any of the other tiled display positions that were not being swapped. The CPU 202 and 2D/3D and video processor 410 will update the tiled display position with the new information for the swapped display. CPU 202 then informs the multi-display processor that data during the next SDVO tiled display transfer would be from the new swapped display and can be processed for the remote display system associated with the new data. Numerous other methods of synchronization, including resetting the display control 404 to utilize another area of memory for the display operations, are possible to achieve swapping benefits of supporting more users than there are hardware display channels at any one time.

As described, it is possible to support more remote display systems 300-306 than there are positions in the tiled display 406. The synchronization operations will take away some of the potential bandwidth for display updates, but overall, the system will be able to support more displays. In particular, one could consider a system 100 where many remote displays have little or no activity. In another system, where many of the remote displays do require frequent updates, the performance for each remote display would be gracefully degraded through a combination of reduced frame rate and reducing the visual detail of the content within the display. If the system only included one display controller 404, the group of six displays, 1 through 6, could be reconfigured such that the display controller would utilize the display memory associated with the group of six displays 7 through 12 for a time, then be switched back.

The tiled method typically provides for the Graphics Controller providing the multi-display processor with the complete frame information for each tile. There is also the ability to provide sub frame information via this tile approach provided that the sub frame information relating to the position information of the subframe is also provided. In a sub framed method, instead of a complete frame occupying the tile, a number of subframes that can fit are fit into the same area. Those subframes can all relate to one frame or relate to multiple frames.

Another method to increase the number of remote displays supported is to bank switch the entire tile display area. For example, tiles corresponding to displays 1 through 6 may be refreshed over the SDVO1 214 output while tiles corresponding to displays 7 through 12 are being drawn and updated. At the appropriate time, a bank switch occurs and the tiles for displays 7 through 12 become the active displays and tiles for displays 1 through 6 are then redrawn where needed. By switching all of the tiles in a bank at once, the number of synchronization steps may be fewer than by switching each display independently.

To recap, by configuring and combining at a system level, the graphics display controller 212 with a multi-display processor 224 is able to support configurations varying in the number of remote display systems, resolution and color depth for each display, and the frame rate achievable by each display. An improved configuration could include four or more SDVO output ports, and combined with the swapping procedure, could increase the ability of the system to support even more remote display systems at higher resolutions. However, increasing the overall SDVO bandwidth and using dedicated memory and swapping for the multi-display processor comes at an expense in both increased system cost and potentially increased system latency.

Figure 7:
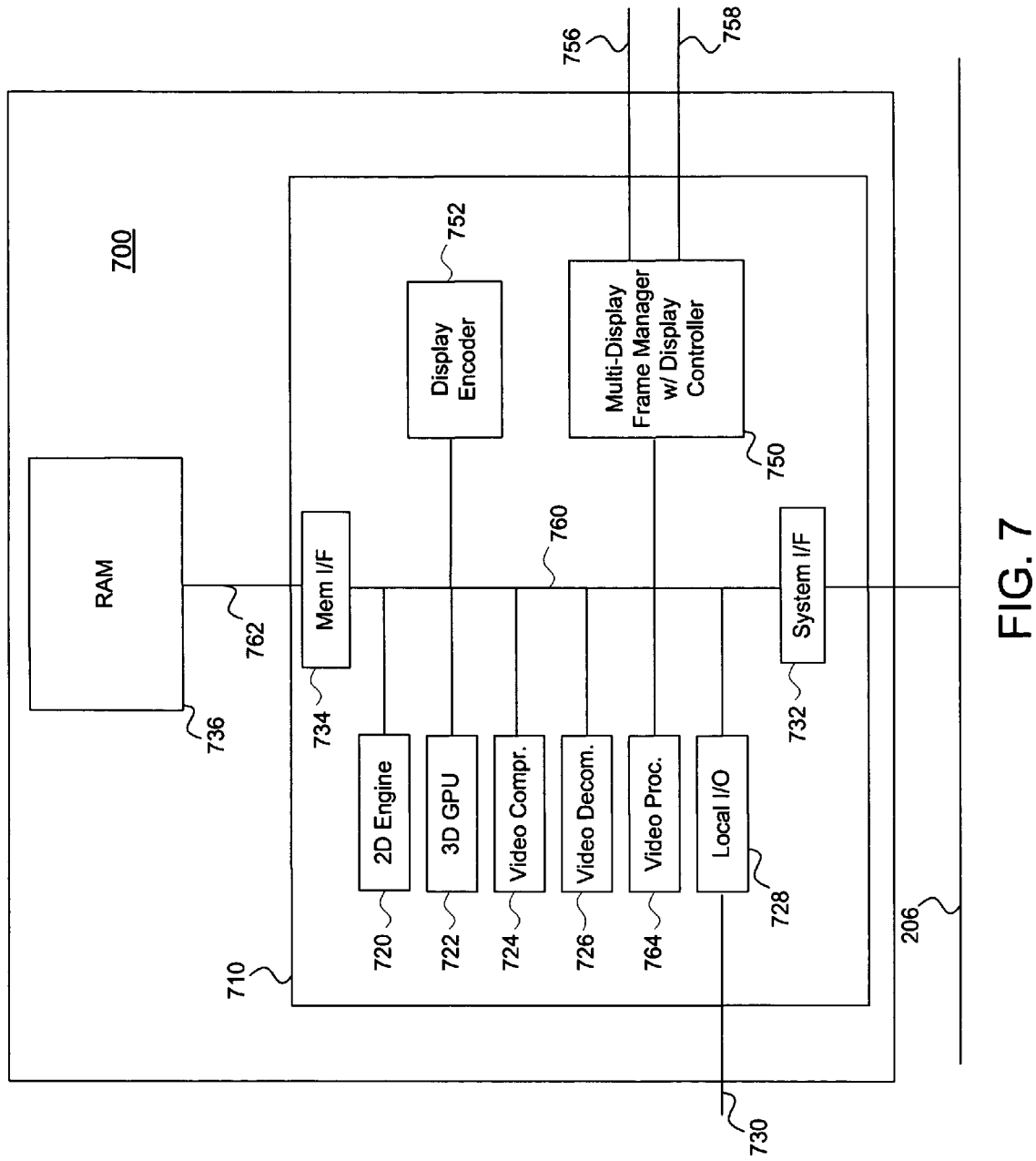
FIG. 7 is a block diagram of an exemplary graphics controller with an integrated multi-display support, in accordance with one embodiment of the invention.

In an enhanced embodiment, not appropriate for all systems, it is desirable to combine the multi-display processor with the system's graphics and video display controller and share the same memory subsystem. FIG. 7 shows a preferred System-On-Chip (SOC) integrated circuit embodiment that combines the multi-user display capabilities along with what is typically referred to as a graphics controller in a computer system. The combined graphics controller with integrated multi-display support 710 incorporates the functions of both graphics and display controller 212 and multi-display processor 224 and as such this combined SOC would also connect to main system bus 206 in the host computer of a multi-display system 100 (FIG. 1).

In a preferred embodiment, the SOC graphics controller with integrated multi-display support 710 includes a 2D Engine 720, 3D Graphics Processing Unit (GPU) 722, a system interface 732 such as PCI express, control for local I/O

728 that can include interfaces 730 for video or other local I/O, such as a direct interface to a network controller, and a memory interface 734. Additionally, the graphics controller may include some combination of video compressor 724 and video decompressor 726 hardware, or some form of programmable video processor 764 that combines those and other video related functions.

While an embodiment can utilize the software driven GPU and Video Processor approach for multi-display support as described above, the performance of the system as measured by the frame rates for the number of remote displays will be highest when using a graphics controller that includes a display subsystem optimized for multi-display processing. This further preferred embodiment (FIG. 7) includes a multi-display frame manager with display controller 750 and a display data encoder 752 that compresses the display data. The multi-display frame manager with display controller 750 may include outputs for local displays 756 and 758, though the remote multi-display aspects are supported over the system interface 732 or potentially a direct connection 730 to the network controller. The system bus 760 is illustrative of the connections between the various processing units as well as the system interface 732 and memory interface 734. The system bus 760 may include various forms of arbitrated transfers and may also have direct paths from one unit to another for enhanced performance.

The multi-display frame manager with display controller 750 supports similar functions of the FIG. 6 Frame Manager 604 and Frame Comparer 602 of multi-display processor 224. By way of being integrated with the graphics subsystem, some of the specific implementation capabilities improve, though the previously described functions of managing the multiple display frames in memory, determining which frames have been modified by the CPU, running various graphics processors and video processors, and managing the frames or blocks within the frames to be processed by the display data encoder 752 are generally supported.

In the FIG. 2 multi-chip approach of host computer 200, the graphics and display controller 212 is connected via the SDVO paths to the multi-display processor 224, and each controller and processor has its own RAM system. Conversely, in FIG. 7 the graphics controller with integrated multi-display support 710 uses the shared RAM 736 instead of the SDVO paths. Using the RAM 736 eliminates or reduces several bottlenecks in the system. First, the SDVO path transfer bandwidth issue is eliminated. Second, by sharing the memory, the multi-display frame manager with display controller 750 is able to read the frame information directly from the memory thus eliminating the read of memory by the graphics and display controller 212. For systems where the multi-display processor 224 was not performing operations on the fly, a write of the data into RAM is also eliminated.

Host computer 200 allows use of a graphics and display processor 212 that may have not been designed for a multi-display system. Since the functional units within the graphics controller with integrated multi-display support 710 may all be designed to be multi-display aware, additional optimizations can also be implemented. In a preferred embodiment, instead of implementing the multi-display frame support with a tiled display frame architecture, the multi-display frame manager with display controller 750 may be designed to map support for multiple displays that are matched as far as resolution and color depth in their corresponding remote display systems.

By more directly matching the display in memory with the corresponding remote display systems, the swapping scheme described above can be much more efficiently implemented.

Similarly, the tracking software layer described earlier could be assisted with hardware that tracks when any pixels are changed in the display memory area corresponding to each of the displays. However, because a single display may include multiple surfaces in different physical areas of memory, a memory controller-based hardware tracking scheme may not be the most economical choice.

The tracking software layer can also be used to assist in the encoding choice for display frames that have changed and require generation of a display update stream. Recall that the encoding is performed to reduce the data required for the remote display system 300 to regenerate the display data generated by the host computer's graphics and display controller 212. The tracking software layer can help identify the type of data within a surface where the display controller-±404 translates the surface into a portion of the display frame. That portion of the display frame, whether precinct based or scan line based encoding is used, can be identified to the data encoder 606, or display data encoder 752, as to allow the most optimal type of encoding to be performed.

For example, if the tracking software layer identifies that a surface is real time video, then an encoding scheme more effective for video, which has smooth spatial transitions and temporal locality, can be used for those areas of the frame. If the tracking software layer identifies that a surface is mostly text, then an encoding scheme more effective for the sharp edges and the ample white space of text can be used. Identifying what type of data is in what region is a complicated problem. However, this embodiment of a tracking software layer allows an interface into the graphics driver architecture of the host display system and host operating system that assists in this identification. For example, in Microsoft Windows, a surface that utilizes certain DirectShow commands is likely to be video data whereas a surface that uses color expanding bit block transfers (Bit Blits) normally associated with text, is likely to be text. Each operating system and graphics driver architecture will have its own characteristic indicators. Other implementations can perform multiple types of data encoding in parallel and then choose to use the encoding scheme that produces the best results based on encoder feedback.

Some types of encoding schemes are particularly more useful for specific types of data, and some encoding schemes are less susceptible to the type of data. For example, RLE is very good for text and very poor for video, DCT based schemes are very good for video and very poor for text, and wavelet transform based schemes can do a good job for both video and text. Though any type of lossless or lossy encoding can be used in this system, wavelet transform encoding, which also can be of a lossless or lossy type, for this application will be described in some detail. While optimizing the encoding based on the precinct is desirable, it can not be used where it will cause visual artifacts at the precinct boundaries or create other visual problems.

Figure 8:
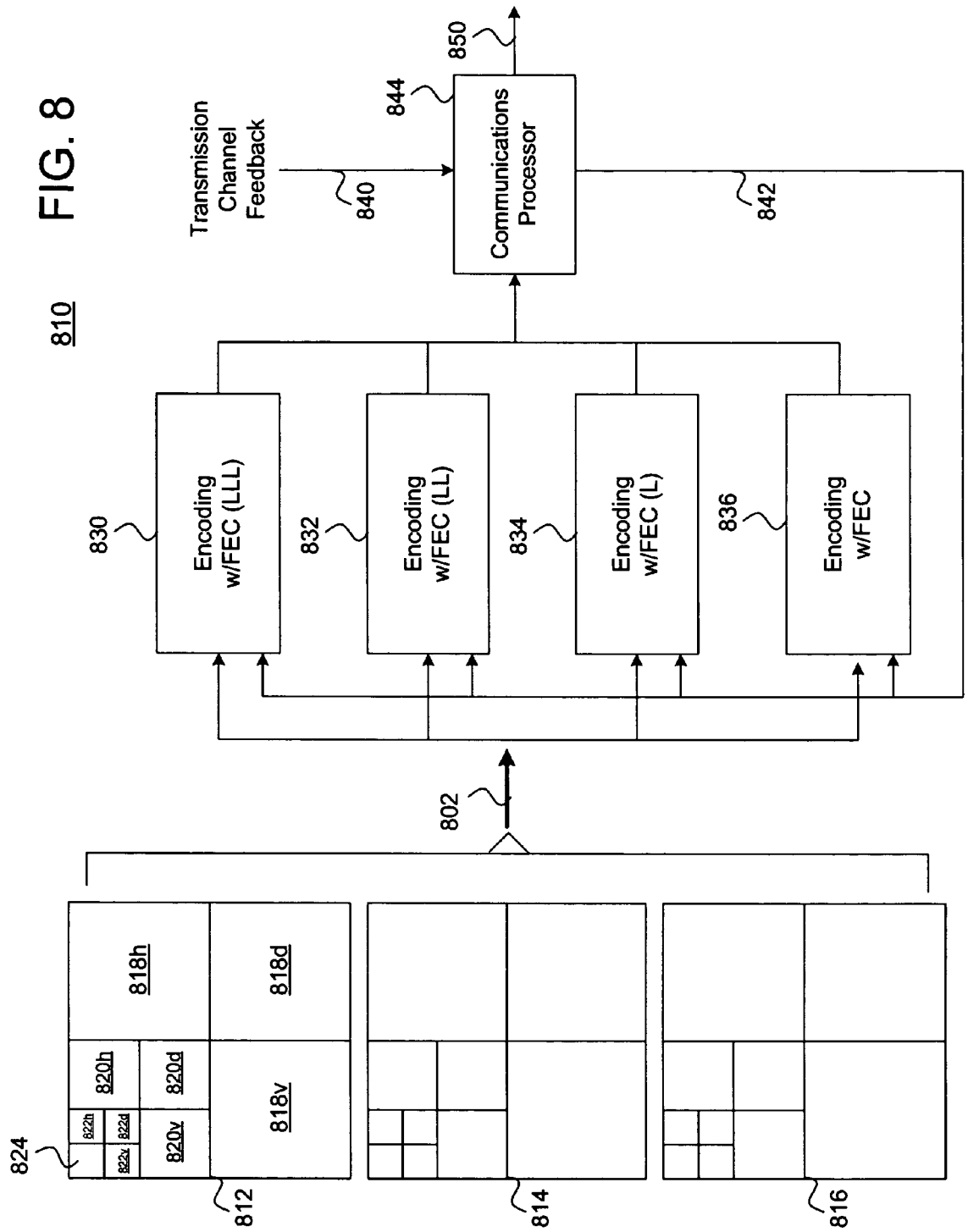
FIG. 8 is a data flow chart for how subband encoded frames of display proceed thorough the processing steps in accordance with one embodiment of the invention.

FIG. 8 illustrates the process of converting from a frame of video through to the communication processor. The first step is for each component of the video to be decomposed via subband encoding into a multi-resolution representation. The quad-tree-type decomposition for the luminance component Y is shown in 812, for the first chrominance component U in 814 and for the second chrominance component V in 816. The quad-tree-type decomposition splits each component into four subbands where the first subband is represented by 818(*h*) 818(*d*) and 818(*v*) with the h, d and v denoting horizontal, diagonal and vertical. The second subband, which is one half the first subband resolution in both the horizontal and vertical direction, is represented in 820(*h*), 820(*d*) and 820(*v*). The third subband is represented by 822(*h*), 822(*d*) and 822(*v*) and the fourth subband by box 824. Forward Error Correction (FEC) is an example of a method for improving the error resilience of a transmitted bitstream. FEC includes the process of adding additional redundant bits of information to the base bits such that if some of the bits are lost or corrupted, the decoder system can reconstruct a complete, or nearly complete, representation of the frame. The more bits of redundant information that are added during the FEC step, the more strongly protected, and the more resilient to errors the bit stream will be. In the case of the wavelet encoded video, the lowest resolution subbands of the video frame may have the most image energy and can be protected via more FEC redundancy bits than the higher resolution subbands of the frame.

In a typical network system, the FEC bits are used to protect a complete packet of information where each packet is protected by a checksum. When the checksum properly arrives at the receiving end of a network transmission, the packet of information can be assumed to be correct and the packet is used. When the checksum arrives improperly, the packet is assumed to be corrupted and is not used. If packets of critical information are corrupted, the network protocol may re-transmit them. For video, retransmission should be avoided as by the time a retransmitted packet is sent, it may be too late to be of use. Adding the associated data traffic of retransmission can worsen a corrupted packet situation. It is therefore desirable to assure that the more important packets are more likely to arrive uncorrupted and that less important packets, even if they are corrupted, are not retransmitted. The retransmission characteristics of a network can be managed in a variety of ways including selection of TCP/IP and UDP style transmissions along with other network handshake operations.

The different subbands for each component are passed via path 802 to the encoding step. The encoding step is performed for each subband with the encoding with FEC performed on the first subband 836, on the second subband 834, on the third subband 832 and on the fourth subband 830. Depending on the type of encoding performed, there are various other steps applied to the data prior to or as part of the encoding process. These steps can include filtering or differencing between the subbands. Encoding the differences between the subbands is one of the steps of a type of compression. For typical images, most of the image energy resides in the lower resolution representations of the image. The other bands contain higher frequency detail that is used to enhance the quality of the image. The encoding steps for each of the subbands uses a method and bitrate most suitable for the amount of visual detail contained in that subimage.

There are also other scalable coding techniques that can used to transmit the different image subbands across different communication channels having different transmission characteristics. This technique can be used to match the higher priority source subbands with the higher quality transmission channels. This source based coding can be used where the base video layer is transmitted in a heavily protected manner and the upper layers are protected less or not at all. This can lead to good overall performance for error concealment and will allow for graceful degradation of the image quality. Another technique of Error Resilient Entropy Coding (EREC) can also be used for high resilience to transmission errors.

In addition to the dependence on the subimage visual detail, the type of encoding and the strength of the FEC is dependent on the transmission channel error characteristics. The transmission channel feedback 840 is fed to the communications processor 844 which then feeds back the information via path 842 to each of the subband encoding blocks. Each of the subband encoders transmits the encoded subimage information to the communications processor 844. The communications processor 844 then transmits the compressed streams via path 850 to the target transmission subsystem.

As an extension to the described 2-D subband coding, 3-D subband coding can also be used. For 3-D subband coding, the subsampled component video signals are decomposed into video components ranging from low spatial and temporal resolution components to components with higher frequency details. These components are encoded independently using the method appropriate for preserving the image energy contained in the component. The compression is also performed independently through quantizing the various components and entropy coding of the quantized values. The decoding step is able to reconstruct the appropriate video image by recovering and combining the various image components. A properly designed system, through the encoding and decoding of the video, preserves the psychovisual properties of the video image. Block matching and block motion schemes can be used for motion tracking where the block sizes may be smaller than the precinct size. Other advanced methods such as applying more sophisticated motion coding techniques, image synthesis, or object-based coding are also possible.

Additional optimizations with respect to the transmission protocol are also possible. For example, in one type of system there can be packets that are retransmitted if errors occur and there can be packets that are not retransmitted regardless of errors. There are also various error rate thresholds that can be set to determine if packets need to be resent. By managing the FEC allocation, along with the packet transmission protocol with respect to the different subbands of the frame, the transmission process can be optimized to assure that the decoded video has the highest possible quality. Some types of transmission protocols have additional channel coding that may be managed independently or combined with the encoding steps.

System level optimizations that specifically combine the subband encoding with the UWB protocol are also possible. In one embodiment, the subband with the most image energy utilizes the higher priority hard reservation scheme of the medium access control (MAC) protocol. Additionally, the low order band groups of the UWB spectrum that typically have higher ranges can be used for the higher image energy subbands. In this case, even if a portable TV was out of range of the UWB high order band groups, the receiver would still receive the UWB low order band groups and be able to display a moderate or low resolution representation of the original video.

Figure 9:
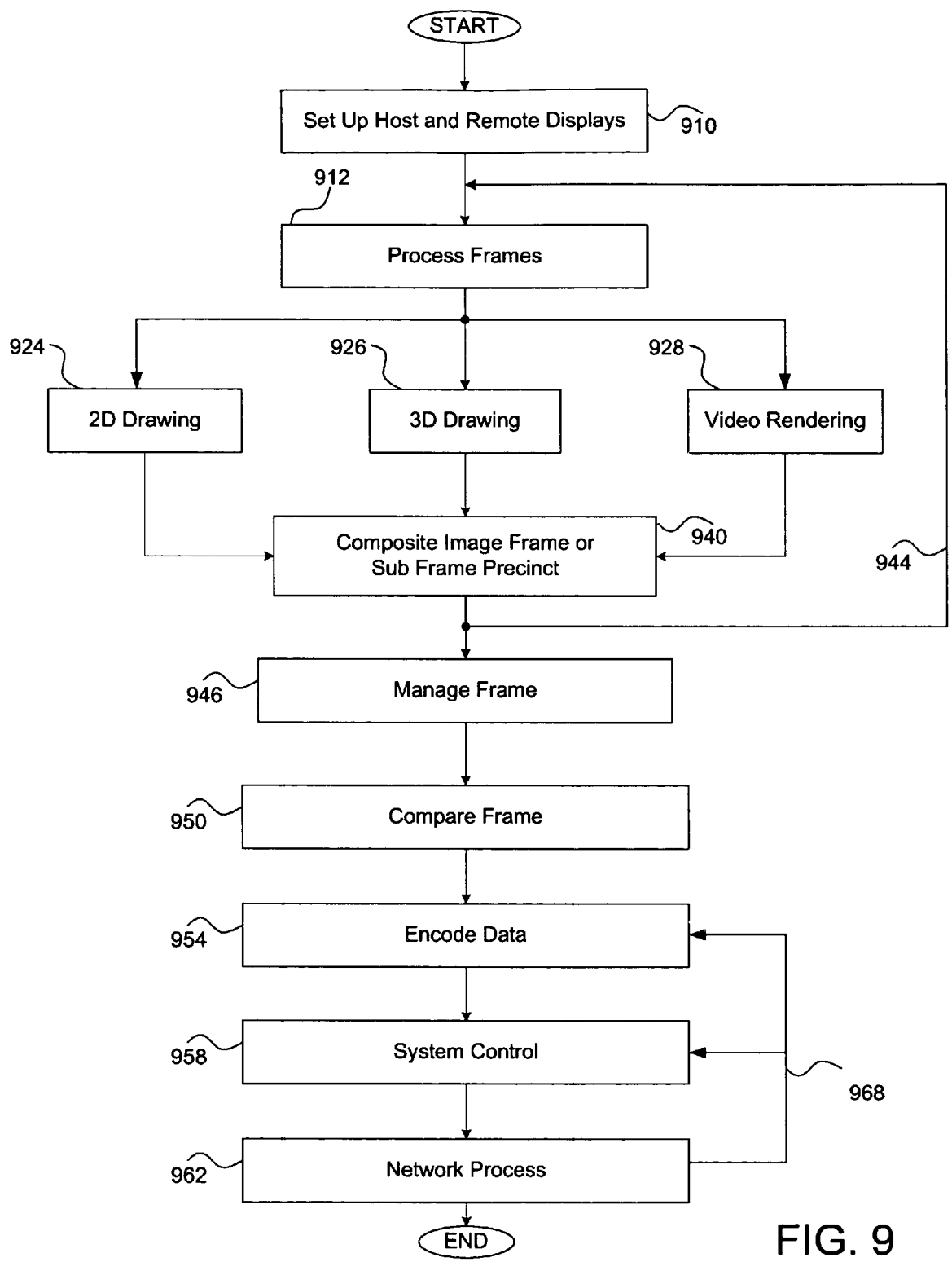
FIG. 9 is a flowchart of steps in a method for performing multi-display windowing, selective encoding and selective transmission, in accordance with one embodiment of the invention.

FIG. 9 is a flowchart of method steps for performing the multi-display processing procedure in accordance with one embodiment of the invention. For the sake of clarity, the procedure is discussed in reference to display data. However, procedures relating to audio and other data are equally contemplated for use in conjunction with the invention. In the FIG. 9 embodiment, initially, in step 910, multi-room television system 200 and remote display system 300 follow the various procedures to initialize and set up the host side and display side for the various subsystems to enable each display. In step 912, the graphics operations of graphics display controller 212 process the various types of inputs to determine what graphics operations need to be performed. This simplified flow chart does not specifically call for the input from the remote display system 300 to be processed for determining the responsive graphics operations, though another method would include those steps.

If graphics operations include 2D drawing, then, in step 924, the 2D drawing engine 720 or associated function unit of graphics and display processor 212 preferably processes the operations into the appropriate display surface in the appropriate RAM. Similarly, in step 926 3D drawing is performed to the appropriate display surface in RAM by either the 3D GPU 722 or the associated unit in graphics and display processor 212. Similarly, in step 928, video rendering is performed to the appropriate display surface in RAM by one of the video processing units 724, 726 or the associated units in graphics and display processor 212. Though not shown, any CPU subsystem 202-initiated drawing operations to the RAM would occur at this stage of the flow as well.

The system in step 940 composites the multiple surfaces into a single image frame which is suitable for display. This compositing can be performed with any combination of operations by the CPU subsystem 202, 2D engine 720, 3D GPU 722, video processing elements 724, 726 or 764, multi-display frame manager with display controller 750 or the comparable function blocks of graphics and display controller 212. Once the compositing operation is performed, step 946 performs the frame management with the frame manager 604 or multi-display frame manager with display controller 750 which includes tracking the frame updates for each remote display. Then step 950 compares the frame to the previous frame for that same remote display system via a combination of the software tracking layer, combined with frame comparer 602 or the multi-display frame manager with display controller 750. The compare frame step 950 identifies which areas of each frame need to be updated for the remote displays where the areas can be identified by precincts, scan line groups or another manner.

The system, in step 954, then encodes the data that requires the update via a combination of software and data encoder 606 or display data encoder 752. The data encoding step 954 can use the tracking software to identify what type of data is going to be encoded so that the most efficient method of encoding is selected or the encoding hardware can adaptively perform the encoding without any knowledge of the data. Feedback path 968 from the network process step 962 may be used by the encode data step 954 in order to more efficiently encode the data to dynamically match the encoding to the characteristics of the network channel. This may include adjustments to the compression ratio as well as to the error resilience of the encoded data. The error resilience may identify different priorities of data within the encoded data stream for any given display which is used by in step 958 to perform the system control for each frame update.

The system, in step 958, utilizes the encoded data information and the associated system information to manage the frame updates to the remote displays. The system control step 958 also utilizes the network transmission channel information via feedback path 968 to manage and select some of the higher level network decisions. This system control step is performed with some combination of the CPU subsystem 202 and system controller unit 608 or multi-display frame manager with display controller 750.

The network process step 962 uses the information from the system control. This information can include information as to which remote display requires which frame update streams, what type of network transmission protocol is used for each frame update stream, and what the priority and retry characteristics are for each portion of each frame update stream. The network process step 962 utilizes the network controller 228 to manage any number of network connections. The various networks may include Gigabit Ethernet, 10/100 Ethernet, Power Line Ethernet, Coaxial cable based Ethernet, phone line based Ethernet, or wireless Ethernet standards such as 802.11a, b, g, n, s and future derivatives. Other non-Ethernet connections are also possible and can include USB, 1394a, 1394b, 1394c or other wireless protocols such as Ultra Wide Band (UWB) or WiMAX.

Figure 10:
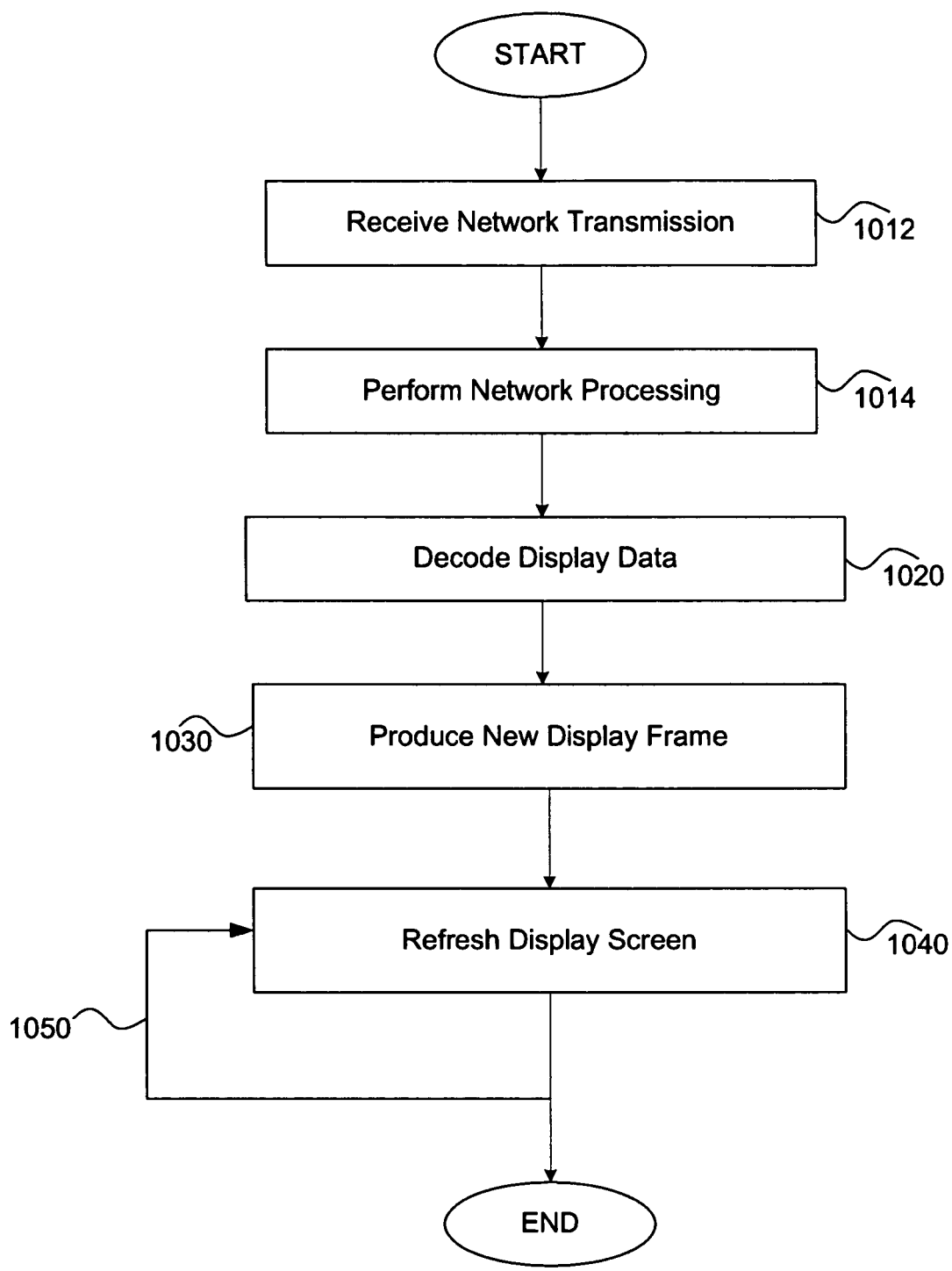
FIG. 10 is a flowchart of steps in a method for performing a local decode and display procedure for a client, in accordance with one embodiment of the invention.

FIG. 10 is a flowchart of steps in a method for performing a network reception and display procedure in accordance with one embodiment of the invention. For reasons of clarity, the procedure is discussed in reference to display data. However, procedures relating to audio and other data are equally contemplated for use in conjunction with the present invention.

In the FIG. 10 embodiment, initially, in step 1012, remote display system 300 preferably receives a frame update stream from host computer 200 of a multi-display system 100. Then, in step 1014, network controller 326 preferably performs a network processing procedure to execute the network protocols to receive the transmitted data whether the transmission was wired or wireless.

In step 1020, data decoder and frame manager 328 receives and preferably manipulates the data information into an appropriate displayable format. In step 1030, data decoder and frame manager 328 preferably may access the data manipulated in step 1020 and produce an updated display frame into RAM 312. The updated display frame may include display frame data from prior frames, the manipulated and decoded new frame data, and any processing required to conceal display data errors that occurred during transmission of the new frame data.

Finally, in step 1040, display controller 330 provides the most recently completed display frame data to remote display screen 310 for viewing by a user of the remote display system 300. In the absence of either a screen saving or power down mode, the display processor will continue to update the remote display screen 310 with the most recently completed display frame, as indicated with feedback path 1050, in the process of display refresh.

The present invention therefore implements a flexible multi-display system that supports remote displays that a user may effectively utilize in a wide variety of applications. For example, a business may centralize computer systems in one location and provide users at remote locations with very simple and low cost remote display systems 300 on their desktops. Different remote locations may be supported over a LAN, WAN or through another connection. In another example, the host computer may be a type of video server or multi-source video provider instead of a traditional computer system.

In addition, users may flexibly utilize the host computer of a multi-display system 100 to achieve the same level of software compatibility and a similar level of performance that the host system could provide to a local user. Therefore, the present invention effectively implements a flexible multi-display system that utilizes various heterogeneous components to facilitate optimal system interoperability and functionality. Additionally, a remote display system may be a software implementation that runs on a standard personal computer where a user over the Internet may control and view any of the resources of the host computer.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment.

Therefore, these and other variations upon the preferred embodiments are intended to be covered by the present invention, which is limited only by the appended claims.

I claim:

1. A graphics and display system capable of supporting multiple displays, comprising:
a System-On-Chip (SOC) integrated circuit including
2D and 3D drawing engines, video processing hardware, and a display controller that share a memory subsystem, that concurrently generate multiple display frames which may each correspond to a display frame at a respective remote display system, and that support
a first number of local display devices via local display paths, and
a second number plurality of remote display systems, not limited by the first number, each enabling a respective remote user to provide user inputs;
a frame buffer which stores display frames organized as sub frame memory areas representing display frame tiles for said remote display systems;
frame compare means that tracks on a frame or sub-frame basis which portions of a display have changed based on a checksum of a grid of a prior frame's display data; and
display data encoder means that compresses the display data from the frame buffer;
means for connecting said SOC to a host CPU in a host computer system running software that works with said SOC to identify modified display frames or sub frames so that only modified display data will be transferred via a network subsystem to corresponding ones of said remote display systems; and
means for connecting said SOC to a network subsystem in communication with said second number of remote display systems and for enabling said plurality of remote display systems to transmit user inputs to said SOC.

2. The system of claim 1 wherein said Data encoder function effectively changes the resolution and color depth from the existing display format with a graceful degradation of the display quality and without the need to reconfigure the remote display device.

3. The system of claim 1 wherein said tracking software or other utilities within the graphics and display controller tracks which frames of which remote display systems are being updated.

4. The system of claim 1 wherein said CPU software swaps static displays out of the shared frame buffer and into main system RAM in order to process a larger number of displays than could be active in said frame buffer at one time.

5. The system of claim 1 wherein to assist said CPU software in identification of modified display frames, said display and graphics controller includes hardware which tracks when pixels are changed in the display memory area.

6. The system of claim 1 wherein said CPU software assists in choosing the method for encoding (the) display frames that have been modified.

7. A graphics and display system capable of supporting a first number of local display devices and an independent second number of remote display systems, comprising:
means to connect said graphics and display system to a host computer system which includes
a CPU subsystem running software that supports multiple remote users;
a display controller capable of supporting
a first number of local display devices by supplying display frames via first local display output paths, and
a second number of remote display systems not limited by the first number; and
a shared frame buffer which stores display frames organized as sub frame memory areas representing the display frame tiles for said remote display systems; and
2D and 3D drawing engines and video processing hardware for generating multiple display frames which may each correspond to a display frame at a remote display system; and
a data encoder which accesses the shared frame buffer and utilizes sub band encoding techniques to encodes sub frame data into wavelet transform multi-resolution compressed representations for transmission to update said remote display systems; and
means to connect managed and encoded output of said display controller to a network controller which in turn can be connected to said second number of remote display systems, each of which receives one or more of the multi-resolution compressed representations of the sub frame data.

8. The system of claim 7 wherein said display data encoder and network controller perform source based forward error correction techniques, transmit lower resolution sub bands of said wavelet transform multi-resolution data in a heavily protected manner, and transmit higher resolution sub bands in a less protected manner.

9. The system of claim 7 wherein
said 2D, 3D and video processing constructs sub frame images into display planes of data,
said display controller is configured to generate multiple composite display planes of data within said shared frame buffer, and
said multi-display processor processes said composite frames uniquely for each of the multiple remote display systems.

10. The system of claim 7 wherein said multi-display processor receives frame display data and stores said frame display data to RAM before a frame manager and a frame comparer perform precinct-based processing, and wherein said data encoder performs different types of encoding algorithms based on the type of frame data within the subframe and operates only on required subframes which have changed from the prior display frame for the corresponding said remote display system.

11. The system of claim 7 wherein said network controller is integrated with said multi-display processor and shares a common RAM.

12. The system of claim 7 wherein said network controller feeds back network transmission information to said data encoder and said data encoder responsively adjusts said data encoding to match said data encoding to the network characteristics.

13. The system of claim 7 wherein said display data encoder and network controller transmit the different resolution sub bands of said wavelet transform multi-resolution data over different communication channels.

14. The system of claim 7 wherein said network controller utilizes a transmission protocol such that if errors occur in certain of the frame data packets then the erroneous packets are not retransmitted.

* * * * *